United States Patent
Kawase et al.

(10) Patent No.: US 10,493,737 B2
(45) Date of Patent: Dec. 3, 2019

(54) THERMOPLASTIC RESIN COMPOSITION FOR MATTING, FLUORINE-BASED MATTE FILM, AND FLUORINE-BASED MATTE LAYERED FILM

(71) Applicant: Mitsubishi Chemical Corporation, Tokyo (JP)

(72) Inventors: Yasunori Kawase, Otake (JP); Yuji Kawaguchi, Toyohashi (JP); Koichiro Sanefuji, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 16 days.

(21) Appl. No.: 15/326,144

(22) PCT Filed: Jul. 14, 2015

(86) PCT No.: PCT/JP2015/070203
§ 371 (c)(1),
(2) Date: Jan. 13, 2017

(87) PCT Pub. No.: WO2016/010051
PCT Pub. Date: Jan. 21, 2016

(65) Prior Publication Data
US 2017/0197394 A1    Jul. 13, 2017

(30) Foreign Application Priority Data

Jul. 14, 2014 (JP) ................. 2014-143856
Oct. 23, 2014 (JP) ................. 2014-216065
Jan. 27, 2015 (JP) ................. 2015-013211

(51) Int. Cl.
| | |
|---|---|
| *B32B 27/30* | (2006.01) |
| *C08J 5/18* | (2006.01) |
| *C08F 220/18* | (2006.01) |
| *B32B 27/06* | (2006.01) |
| *C08L 27/16* | (2006.01) |
| *C08L 27/12* | (2006.01) |

(52) U.S. Cl.
CPC .............. *B32B 27/30* (2013.01); *B32B 27/06* (2013.01); *C08F 220/18* (2013.01); *C08J 5/18* (2013.01); *C08L 27/12* (2013.01); *C08L 27/16* (2013.01); *B32B 2307/406* (2013.01); *C08F 2220/1825* (2013.01); *C08J 2327/16* (2013.01); *C08J 2433/08* (2013.01); *C08J 2457/06* (2013.01); *C08L 2205/03* (2013.01)

(58) Field of Classification Search
CPC ... B32B 24/30; B32B 27/06; B32B 2307/406; C08L 27/16; C08L 2205/03; C08F 220/18; C08F 2220/1825; C08J 5/18; C08J 2327/16; C08J 2433/08; C08J 2457/06

See application file for complete search history.

(56) References Cited

FOREIGN PATENT DOCUMENTS

| | | | |
|---|---|---|---|
| EP | 2 530 118 A1 | 12/2012 | |
| EP | 2530118 A1 * | 12/2012 | ......... B29C 47/0021 |
| JP | 57-14650 A | 1/1982 | |
| JP | 60-94413 A | 5/1985 | |
| JP | 6-57007 A | 3/1994 | |
| JP | 2001-205755 A | 7/2001 | |
| JP | 2005-290062 A | 10/2005 | |
| JP | 2007-138001 A | 6/2007 | |
| JP | 2008-7709 A | 1/2008 | |
| JP | 2008-120943 A | 5/2008 | |
| JP | 2013-63537 A | 4/2013 | |
| JP | 2015-160874 A | 9/2015 | |
| WO | 2011/093300 A1 | 8/2011 | |
| WO | 2015/050266 A1 | 4/2015 | |

OTHER PUBLICATIONS

Supplementary European Search Report and European Search Opinion dated Aug. 28, 2017 in European Patent Application No. 15821715.8.
International Search Report dated Oct. 20, 2015, in PCT/JP2015/070203, filed Jul. 14, 2015.
Office Action dated May 21, 2019, in Japanese Patent Application No. 2015-537474 (w/ computer-generated English translation).

* cited by examiner

*Primary Examiner* — Robert D Harlan
(74) *Attorney, Agent, or Firm* — Oblon, McClelland, Maier & Neustadt, L.L.P.

(57) ABSTRACT

Provided are a thermoplastic resin composition whereby gum formation is suppressed during manufacturing of a matte fluororesin molded article such as a film, and a fluorine-based matte film having excellent matte properties and chemical resistance, and a layered film. A thermoplastic resin composition (α) for a chemical-resistant matte film, comprising a fluorine-based resin (A), a matting agent (B) which is a thermoplastic resin insoluble in the fluorine-based resin (A), and a thermoplastic resin (C) soluble in the fluorine-based resin (A). A thermoplastic resin composition (β) containing the fluorine-based resin (A) and an acrylic matting agent (D) which is a thermoplastic resin, the content ratio of alkyl acrylate units with respect to 100% by mass of monofunctional monomer units in the monomer units constituting the matting agent (D) being 50-100% by mass, and the content ratio of other monofunctional monomer units being 0-50% by mass. A matte film molded from the abovementioned thermoplastic resin compositions. A layered film in which an acrylic resin is layered on the matte film.

13 Claims, No Drawings

US 10,493,737 B2

THERMOPLASTIC RESIN COMPOSITION FOR MATTING, FLUORINE-BASED MATTE FILM, AND FLUORINE-BASED MATTE LAYERED FILM

TECHNICAL FIELD

The present invention relates to a thermoplastic resin composition containing a fluorine-based resin, a fluorine-based matte film obtained by molding the thermoplastic resin composition, and a fluorine-based matte layered film.

BACKGROUND ART

Since fluorine-based films containing a fluorine-based resin, in particular, a vinylidene fluoride-based resin, have excellent weather resistance, chemical resistance and contamination resistance, they are widely used as a protective film which is laminated on the surface of various substrates such as plastics, glasses, slates, rubbers, metal plates and wood plates. Also, a substrate whose surface is protected with a fluorine-based film is used for various applications including interior materials and exterior materials of the building, and furniture. In recent layers, for substrates such as wall paper or leather furniture used indoors, high quality of the image is required, and thus those obtained by laminating a fluorine-based matte film on the surface are more frequently used.

As a method for producing the fluorine-based matte film, (1) a method of forming fine irregularities on a film surface using a metal or rubber mat roll with roughened surface followed by heat molding, (2) a method of forming fine irregularities on a surface by spraying fine particles such as sand or metal to a film surface to be treated (sand blast method), (3) a method of coating a matting agent on a film to be treated, (4) a method of adding a fine organic or inorganic filler to a resin for constituting a film, and (5) a method of producing a film with matte appearance by utilizing a difference in solubility parameters between a fluorine-based resin and an acrylic resin are known.

Regarding the method (1), there is a problem that the mat roll can be clogged by an additive such as a UV absorber which is added to a fluorine-based resin. Regarding the method (2), there is a problem that the film to be treated is stretched or fractured at the time of sand blasting. Regarding the method (3), there is a problem that it is not easy to coat the matting agent as it is not adhesive to the fluorine-based resin.

Regarding the method (4), it is described that a fluorine-based film having favorable matte property and excellent chemical resistance can be obtained if an organic matting agent is used (Patent Literature 1). However, there is a problem that, when a fluorine-based film is produced using the organic filler described in Patent Literature 1 by melt extrusion molding method using T die, a so-called gum is formed as an aggregate resulting from precipitation of the resin near an outlet of T die. When there is an occurrence of gum, a foreign matter-like or stripe-like defective appearance caused by the gum is shown on the film.

Regarding the method (5), a method of using a non-crosslinked acrylic resin containing hydroxyl group as a matting agent is known (Patent Literature 2). However, as there is a problem of not having stable exhibition of matte property, it is not suitable for industrial production.

CITATION LIST

Patent Literature

Patent Literature 1: JP 2013-063537 A
Patent Literature 2: WO 2011/093300 A

SUMMARY OF THE INVENTION

Problem to be Solved by the Invention

The present invention is devised under the circumstances described above, and an object of the present invention is to provide a thermoplastic resin composition which allows stable exhibition of matte property at the time of producing a fluorine-based matte film and can suppress an occurrence of gum as a cause of defective appearance at the time of producing a matte fluororesin molded article like film. Another object of the present invention is to provide, by using the aforementioned thermoplastic resin composition, a fluorine-based matte film and a fluorine-based matte layered film having excellent matte property and excellent chemical resistance.

Means for Solving Problem

The problems described above can be solved by any one of the following [1] to [20] of the present invention.

[1] A thermoplastic resin composition ($\alpha$) for a chemical resistant matte film consisting of a fluorine-based resin (A), a matting agent (B) which is a thermoplastic resin insoluble in the fluorine-based resin (A), and a thermoplastic resin (C) soluble in the fluorine-based resin (A).

[2] The thermoplastic resin composition described in the above [1], in which the matting agent (B) is a non-crosslinked acrylic resin containing a hydroxy group.

[3] The thermoplastic resin composition ($\alpha$) described in the above [1], in which the thermoplastic resin (C) does not contain a hydroxy group.

[4] The thermoplastic resin composition ($\alpha$) described in the above [1], in which the matting agent (B) is contained at 1 to 50 parts by mass and the thermoplastic resin (C) is contained at 20 to 90 parts by mass relative to 100 parts by mass of the fluorine-based resin (A).

[5] The thermoplastic resin composition ($\alpha$) described in the above [1], in which the composition satisfies the following relationship:

$$5.2 < SP(B) - SP(AC) < 6.6$$

when SP value of the fluorine-based resin (A) and the thermoplastic resin (C) is SP (AC) and SP value of the matting agent (B) is SP (B).

[6] The thermoplastic resin composition ($\alpha$) described in the above [2], in which hydroxy number of the non-crosslinked acrylic resin containing a hydroxy group is 50 to 200 mgKOH/g.

[7] The thermoplastic resin composition ($\alpha$) described in the above [1], in which the composition satisfies the following relationship:

$$MFR(A) > MFR(C) > MFR(B)$$

when MFR of the fluorine-based resin (A), the matting agent (B), and the thermoplastic resin (C) at conditions including 250° C. and a load of 49 N is MFR (A), MFR (B), and MFR (C), respectively.

[8] A thermoplastic resin composition ($\beta$) for matte film including the fluorine-based resin (A) and the acrylic matting agent (D) as a thermoplastic resin in which content ratio of acrylic acid alkyl ester is 50 to 100% by mass and content ratio of other monofunctional monomer unit is 0 to 50% by mass when monofunctional monomer units in the monomer units constituting the acrylic matting agent (D) is 100% by mass.

[9] The thermoplastic resin composition (β) described in the above [8], in which the acrylic matting agent (D) is a resin which is obtained by polymerizing a monomer component (m14) in the presence of an acrylic acid alkyl ester polymer (P13), content ratio of an acrylic acid alkyl ester unit is 80 to 100% by mass and content ratio of other monofunctional monomer unit is 0 to 20% by mass when monofunctional monomer units in a monomer component (m13) for constituting the polymer (P13) is 100% by mass, content ratio of polyfunctional monomer unit is 0 to 0.6 part by mass relative to total 100 parts by mass of the monofunctional monomer units, and content ratio of an methacrylic acid alkyl ester is 80 to 100% by mass and content ratio of other monofunctional monomer unit is 0 to 20% by mass when monofunctional monomer units in the monomer component (m14) is 100% by mass.

[10] The thermoplastic resin composition (β) described in the above [8], in which content ratio of the fluorine-based resin (A) is 70 to 99% by mass and content ratio of the acrylic matting agent (D) is 1 to 30% by mass when total of the fluorine-based resin (A) and the acrylic matting agent (D) is 100% by mass.

[11] An acrylic matting agent (E) containing 21 to 49% by mass of a (meth)acrylic acid alkyl ester (b6) unit having at least one alkyl group that is selected from the group consisting of a linear alkyl group with 10 to 30 carbon atoms, a branched alkyl group with 10 to 30 carbon atoms, and a cyclic alkyl group with 10 to 30 carbon atoms and may have a substituent group, and 51 to 79% by mass of other monofunctional monomer (b7) unit.

[12] The acrylic matting agent (E) described in the above [11], in which a polyfunctional monomer (b8) unit is further contained at 0 to 0.5 part by mass relative to 100 parts by mass of the total of the (meth)acrylic acid alkyl ester (b6) unit and the other monofunctional monomer (b7) unit.

[13] A thermoplastic resin composition (γ) containing the acrylic matting agent (E) described in the above [11] or [12] at 1 to 100 parts by mass relative to 100 parts by mass of the fluorine-based resin (A).

[14] A crosslinked acrylic matting agent (F) as a thermoplastic resin which is a matting agent used for obtaining a matte fluororesin molded article and is obtained by polymerizing a monomer mixture (b9) including (meth)acrylic acid ester (b10) at 50.0 to 99.9% by mass, other monofunctional monomer (b11) at 0 to 49.9% by mass, and polyfunctional monomer (b12) at 0.1 to 3.0% by mass.

[15] A thermoplastic resin composition (δ) containing the fluorine-based resin (A) at 70 to 99% by mass, the crosslinked acrylic matting agent (F) at 1 to 30% by mass, and other resin (G) at 0 to 29% by mass.

[16] The thermoplastic resin composition described in any one of the above [1] to [10], [13] and [15] in which the fluorine-based resin (A) is a vinylidene fluoride polymer.

[17] A fluorine-based matte film obtained by molding the thermoplastic resin composition described in any one of the above [1] to [10], [13], [15] and [16].

[18] A fluorine-based matte layered film obtained by layering the fluorine-based matte film described in [17] and the acrylic resin (H).

[19] The fluorine-based matte film or a fluorine-based matte layered film described in the above [17] or [18], in which 60 degree surface gloss is 5 to 80 on a matte surface.

[20] The fluorine-based matte film or fluorine-based matte layered film described in any one of the above [17] to [19], in which 60 degree surface gloss standard deviation is 6 or less and the thermoplastic resin composition described in any one of the above [1] to [7] is used.

Effect of the Invention

According to molding of the thermoplastic resin composition of the present invention, it is possible to obtain a fluorine-based matte film having excellent matte property and excellent chemical resistance. Furthermore, an occurrence of gum to cause defective appearance of a film can be prevented at the time of molding the film. Because the fluorine-based matte film of the present invention has an excellent matte property and excellent chemical resistance, it can be used as a raw material of a fluorine-based matte layered film. The fluorine-based matte layered film of the present invention has an excellent matte property and excellent chemical resistance.

MODE(S) FOR CARRYING OUT THE INVENTION

In the present specification, (meth)acryl means acryl or methacryl and (meth)acrylic acid ester indicates acrylic acid ester or methacrylic acid ester.

<First Invention>

First, explanations are given with regard to the thermoplastic resin composition (α) for a chemical resistant matte film consisting of a fluorine-based resin (A), a matting agent (B) which is a thermoplastic resin insoluble in the fluorine-based resin (A), and a thermoplastic resin (C) soluble in the fluorine-based resin (A).

[Fluorine-Based Resin (A)]

Examples of the fluorine-based resin (A) used in the present invention include polyvinylidene fluorides, ethylene tetrafluoroethylene copolymers, polychlorotrifluoroethylenes, polytetrafluoroethylenes, polyvinyl fluorides, tetrafluoroethylene hexafluoropropylene copolymers, tetrafluoroethylene perfluoro(propyl vinyl ether) copolymers, tetrafluoroethylene vinylidene fluoride copolymers, copolymers of vinylidene fluoride and an acrylic monomer such as an alkyl (meth)acrylate, and mixed resins with another resin containing a vinylidene fluoride polymer as a main component. They can be used either singly or in combination of two or more kinds thereof. In particular, the vinylidene fluoride polymers are preferable in terms of the molding property of a fluorine-based matte film and a fluorine-based matte layered film or the compatibility with an acrylic resin.

It is sufficient that the vinylidene fluoride polymer is a vinyl polymer containing a vinylidene fluoride monomer unit, and it may be also a homopolymer of vinylidene fluoride or a copolymer of vinylidene fluoride and another vinyl monomer. Examples of the other vinyl monomer include fluorine-based vinyl monomers such as vinyl fluoride, tetrafluoroethylene, chlorotrifluoroethylene, or hexafluoropropylene; and vinyl monomers such as styrene, ethylene, butadiene, or propylene.

In the present invention, criteria for determining solubility or insolubility of a resin are based on the following method. Two kinds of a thermoplastic raw material are admixed with each other at mass ratio of 1:1. Cylinder temperature is set at a temperature which is higher than the glass transition temperature of those two kinds of a thermoplastic resin, and according to melt extrusion using a twin screw extruder (manufactured by TOSHIBA MACHINE CO., LTD, trade name TEM35), resin pellets are prepared. The obtained pellets are cut by a microtome in a direction that is perpendicular to the resin extrusion direction, and cut surface of the obtained test specimen is observed under a transmission type electron microscope (manufactured by JEOL Ltd., J100S) to see the presence or absence of an island sea structure. When there is no island sea structure or, even if there is an island sea structure, diameter of the island part is less than 100 nm, it is determined to be soluble. On the other hand, when there is an island sea structure and diameter of the island part is 100 nm or more, it is determined to be insoluble.

[Matting Agent (B) as Thermoplastic Resin Insoluble in Fluorine-Based Resin (A)]

In the present invention, examples of the matting agent (B) as a thermoplastic resin insoluble in the fluorine-based resin (A) include a thermoplastic resin which is insoluble in the fluorine-based resin (A). The matting agent (B) as a thermoplastic resin is preferably a non-crosslinked acrylic resin containing a hydroxy group, i.e., an acrylic resin containing a hydroxy group but no polyfunctional monomer unit such as crosslinking monomer unit or alternating graft monomer unit, from the viewpoint of obtaining a delicate matte film. For example, it can be a polymer which is obtained by copolymerizing monomer components containing 1 to 80% by mass of a hydroxyalkyl (meth)acrylic acid (b1) with an alkyl group having 1 to 8 carbon atoms, 20 to 99% by mass of an alkyl methacrylic acid (b2) with an alkyl group having 1 to 13 carbon atoms, and 0 to 79% by mass of an alkyl acrylic acid (b3) with an alkyl group having 1 to 8 carbon atoms, and examples thereof include an acrylic resin which does not contain a polyfunctional monomer unit such as crosslinking monomer unit or alternating graft monomer unit.

Hereinbelow, the matting agent (B) as a thermoplastic resin insoluble in the fluorine-based resin (A) may be simply referred to as "matting agent (B)". Furthermore, the hydroxyalkyl (meth)acrylic acid (b1) with an alkyl group having 1 to 8 carbon atoms may be simply referred to as "the monomer (b1)." Furthermore, the alkyl (meth)acrylic acid (b2) with an alkyl group having 1 to 13 carbon atoms may be simply referred to as "the monomer (b2)." Furthermore, the alkyl acrylic acid (b3) with an alkyl group having 1 to 8 carbon atoms may be simply referred to as "the monomer (b3)."

According to blending the fluorine-based resin (A) with the matting agent (B), elongation of a fluorine-based matte film to be obtained can be adjusted to the same as the elongation of a fluorine-based film. As a result, the fluorine-based matte film and fluorine-based matte layered film of the present invention have no occurrence of a film breaking or the like during secondary processing, and therefore desirable.

Examples of the monomer (b1) as a raw material of the matting agent (B) include 2-hydroxyethyl methacrylic acid, 2-hydroxypropyl methacrylic acid, 2,3-dihydroxypropyl, methacrylic acid, 2-hydroxyethyl acrylic acid, and 4-hydroxybutyl acrylic acid. They may be used either singly or in combination of two or more types thereof. From the viewpoint of exhibiting favorable matte property of a film, 2-hydroxyethyl methacrylic acid is preferable among them.

Content ratio of the monomer (b1) in 100% by mass of the monomer units is preferably 1 to 80% by mass. When the content ratio is 1% by mass or more, a favorable matte effect of a film is obtained. The content ratio is more preferably 5% by mass or more, and even more preferably 20% by mass or more. Furthermore, when the content ratio is 80% by mass or less, an occurrence of non-dispersed particles of the matting agent (B) in film is suppressed so that a favorable film forming property can be obtained. The content ratio is more preferably 50% by mass or less.

Examples of the monomer (b2) as a raw material of the matting agent (B) include methyl methacrylic acid, ethyl methacrylic acid, n-propyl methacrylic acid, i-propyl methacrylic acid, n-butyl methacrylic acid, i-butyl methacrylic acid, and t-butyl methacrylic acid. They may be used either singly or in combination of two or more types thereof. From the viewpoint of having favorable weather resistance of a film, methyl methacrylic acid is preferable among them.

Content ratio of the monomer (b2) in 100% by mass of the monomer units is preferably 20 to 99% by mass. When the content ratio is 20% by mass or more, favorable weather resistance of a film is obtained. The content ratio is more preferably 30% by mass or more. Furthermore, when the content ratio is 99% by mass or less, a favorable property of exhibiting matte property of a film is obtained. The content ratio is more preferably 90% by mass or less.

Examples of the monomer (b3) as a raw material of the matting agent (B) include methyl acrylic acid, ethyl acrylic acid, n-propyl acrylic acid, i-propyl acrylic acid, n-butyl acrylic acid, i-butyl acrylic acid, t-butyl acrylic acid, and 2-ethylhexyl acrylic acid. They may be used either singly or in combination of two or more types thereof.

Content ratio of the monomer (b3) in 100% by mass of the monomer units is preferably 0 to 79% by mass. When the content ratio is 0.5% by mass or more, a favorable dispersion property of the matting agent (B) is obtained, and thus more preferable. The content ratio is more preferably 5% by mass or more. Furthermore, when the content ratio is 79% by mass or less, favorable weather resistance and favorable heat resistance of a film are obtained. The content ratio is more preferably 40% by mass or less, and even more preferably 25% by mass or less.

From the viewpoint of exhibiting a favorable matte property of a film or having good dispersion property of the matting agent (B) in a film, glass transition temperature of the matting agent (B) as a thermoplastic resin is preferably 90° C. or lower, and more preferably 80° C. or lower. In such case, the content ratio of the monomer (b3) in 100% by mass of the monomer units is preferably 0.5 to 30% by mass, and more preferably 0.5 to 20% by mass. Meanwhile, the glass transition temperature of the matting agent (B) is calculated according to the FOX equation using the glass transition temperature value (Polymer Handbook [Polymer Handbook, J. Brandrup, Interscience, 1989]) of a homopolymer of each monomer component.

Hydroxy number of the matting agent (B) is preferably 50 to 200 mgKOH/g. As the hydroxy number is 50 mgKOH/g or more, the matting agent (B) is insoluble in a resin mixture of the fluorine-based resin (A) and the thermoplastic resin (C) insoluble in the fluorine-based resin (A), and the film can exhibit a favorable matte property. Furthermore, as the hydroxy number of the matting agent (B) is 200 mgKOH/g or less, whitening is inhibited for a case in which the film is exposed to hot water, and therefore preferable. Meanwhile, the hydroxy number is calculated by acetylating the hydroxyl group in 1 gram of a solid matter in a solution of a vinyl-based polymer with acetic anhydride and measuring, by titration, the number of milligrams (mg) of potassium hydroxide required for neutralization of the acetic acid that is produced in conjunction with the acetylation.

Intrinsic viscosity of the matting agent (B) as a thermoplastic resin is, from the viewpoint of having favorable dispersion property of the matting agent (B) in film and having favorable film appearance by reducing insoluble components of the matting agent (B) in film, preferably 0.3 L/g or less, and more preferably or 0.12 L/g less. Furthermore, the intrinsic viscosity is preferably 0.01 L/g or more from the viewpoint of having favorable matte property of a film. Meanwhile, intrinsic viscosity of the matting agent (B) is measured at a temperature of 25° C. by using the automatic viscometer AVL-2C manufactured by SUN Electronic Industries Corporation while using chloroform as a solvent.

In order to control the intrinsic viscosity of the matting agent (B), a polymerization regulator such as a mercaptan can be used. Examples of the mercaptan include n-octyl mercaptan, n-dodecyl mercaptan and t-dodecyl mercaptan. The content of the mercaptan is preferably 0.01 part by mass or more relative 100 parts by mass of the matting agent (B) from the viewpoint of having favorable dispersion property. Also, it is preferably 1 part by mass or less from the viewpoint of having favorable matte property of a film.

The Mw (mass average molecular weight)/Mn (number average molecular weight) of the matting agent (B) as a thermoplastic resin is preferably 2.2 or less, and more preferably 2.0 or less. The smaller Mw/Mn makes the molecular weight distribution of the matting agent (B) closer to monodispersed state and the high molecular weight component is decreased, and thus an occurrence of a non-melted product which causes poor appearance such as a fish eye in the film is suppressed. Meanwhile, the Mw/Mn represents a value obtained by the measurement by gel permeation chromatography (GPC) under the following GPC measurement conditions.

<GPC Measurement Conditions>
Equipment used: HLC-8320GPC system manufactured by TOSOH CORPORATION
Column: two TGKgel SupaerHZM-H (manufactured by TOSOH CORPORATION, trade name)
Eluent: tetrahydrofuran
Column temperature: 40° C.
Detector: refractive index detector (RI)

Examples of the method for producing the matting agent (B) as a thermoplastic resin include suspension polymerization and emulsion polymerization. Examples of the polymerization initiator used for suspension polymerization include organic peroxides and azo compounds. Examples of the suspension stabilizer include organic colloidal polymer materials, inorganic colloidal polymer materials, inorganic fine particles and the combinations thereof with a surface active agent. Among these, organic suspension stabilizers are preferable and examples thereof include a copolymer of methyl methacrylate and potassium methacrylate, and a copolymer of methyl methacrylate, potassium methacrylate and sodium 2-sulfoethyl methacrylate, which are disclosed in JP 1-168702 A. As for the inorganic suspension stabilizer, a stabilizer which can preferably be removed by the treatment after polymerization such as washing is preferable and examples thereof include calcium triphosphate.

Use amount of the suspension stabilizer is preferably 0.1 part or more by mass relative to 100 parts by mass of the monomer components from the viewpoint of stabilizing suspension polymerization. Also, it is preferably 10 parts or less by mass from the viewpoint of the economic efficiency.

Usually, the suspension polymerization is carried out using a raw material in which a monomer or the like is subjected to aqueous suspension with a polymerization initiator in the presence of a suspension stabilizer. Also, when suspension polymerization is carried out, a polymer which is soluble in the monomer is dissolved in the monomer to carry out the polymerization, if necessary. After the suspension polymerization, it is preferable to remove a cullet by the sieving operation from the beads material obtained by suspension polymerization, in which the cullet results in poor appearance and is an insoluble component in chloroform which is generated during the polymerization. The sieve used in the sieving operation preferably has 150 meshes or less and more preferably 50 meshes or less if a sufficient yield is to be achieved. Also, it preferably has 50 meshes or more and more preferably 150 meshes or more if the cullet is sufficiently removed. In the matting agent (B), it is preferable that the cullet of 300 μm or more is not contained. It is more preferable that the cullet of 100 μm or more is not contained.

When the polymerization is carried out using an inorganic suspension stabilizer, in order to suppress missing print by inhibiting an occurrence of a fish eye in the film to be obtained, it is preferable that the beads material of a thermoplastic resin obtained by suspension polymerization is washed with water to lower the content of the inorganic material in the thermoplastic resin. Examples of the method for this water washing include a dispersing washing method in which solid-liquid separation is carried out after a washing liquid such as nitric acid is added to the beads material of the thermoplastic resin and dispersed, and a passing washing method in which a washing liquid is passed through the beads material of the thermoplastic resin. The washing temperature is preferably 10 to 90° C. from the viewpoint of the washing efficiency.

In the above-mentioned post-treatment such as sieving operation or water washing after the polymerization, in order to efficiently remove a cullet by sieving operation without lowering the product yield as well as to efficiently remove an inorganic material by washing, the average particle diameter of the thermoplastic resin is preferably 300 μm or less and more preferably 100 μm or less. Also, the average particle diameter is preferably 10 μm or more from the viewpoint of the handling property of the polymer. Note that, the average particle diameter of the matting agent (B) as a thermoplastic resin can be measured using a laser diffraction scattering-type particle size distribution measuring apparatus LA-910 manufactured by HORIBA, Ltd.

[Thermoplastic Resin (C) Soluble in Fluorine-Based Resin (A)]

It is sufficient that the thermoplastic resin (C) used for the first invention is a thermoplastic resin soluble in the fluorine-based resin (A). From the viewpoint of the solubility in the fluorine-based resin (A), an acrylic resin is preferable. Examples thereof include those not using a hydroxyl group-containing monomer in raw material among the thermoplastic polymer (C-1) described below and those not using a hydroxyl group-containing monomer in raw material among the rubber-containing polymer (R2) described below. They may be used either singly or in combination of two or more types thereof. Hereinbelow, the thermoplastic resin (C) soluble in the fluorine-based resin (A) may be simply referred to as a "thermoplastic resin (C)."

[Thermoplastic Polymer (C-1)]

The thermoplastic polymer (C-1) is a polymer which has an alkyl methacrylate unit as a main component. As for the polymer which has an alkyl methacrylate unit as a main component, a polymer obtained by polymerizing monomer components containing 50 to 100% by mass of alkyl methacrylate, 0 to 50% by mass of alkyl acrylate, and 0 to 49% by mass of other monomer is preferable from the viewpoint of heat resistance.

Examples of the alkyl methacrylate include methyl methacrylate, ethyl methacrylate, propyl methacrylate, and n-butyl methacrylate. They may be used either singly or in combination of two or more types thereof.

Examples of the alkyl acrylate include methyl acrylate, ethyl acrylate, propyl acrylate, n-butyl acrylate, 2-ethylhexyl acrylate, and n-octyl acrylate. Among them, n-butyl acrylate is preferable. They may be used either singly or in combination of two or more types thereof.

Examples of the other monomer include an acrylic monomer such as lower alkoxy acrylate, cyanoethyl acrylate, acrylamide, or (meth)acrylic acid; an aromatic vinyl monomer such as styrene or alkyl substituted styrene; and a vinyl cyanide monomer such as acrylonitrile or methacrylonitrile. They may be used either singly or in combination of two or more types thereof.

Content ratio of the alkyl methacrylic acid is, from the viewpoint of having favorable heat resistance of a film, preferably 50 to 100% by mass, more preferably 85 to 99.9% by mass, and even more preferably 92 to 99.9% by mass. Content ratio of the alkyl acrylic acid is, from the viewpoint of having favorable heat resistance of a film, preferably 0 to 50% by mass, more preferably 0.1 to 15% by mass, and even more preferably 0.1 to 8% by mass. Content ratio of the other monomer is, from the viewpoint of having favorable heat resistance of a film, preferably 0 to 49% by mass.

As for the method for polymerizing the thermoplastic polymer (C-1), suspension polymerization, emulsion polymerization, bulk polymerization, or the like can be mentioned.

Mass average molecular weight of the thermoplastic polymer (C-1) is preferably 5,000 to 200,000, and more preferably 30,000 to 170,000. Examples of a commercially available product thereof include "ACRYPET VH", "ACRYPET MD", and "ACRYPET MF" (trade names) that are manufactured by Mitsubishi Rayon Co., Ltd.

[Thermoplastic Resin Composition ($\alpha$)]

The thermoplastic resin composition ($\alpha$) as the first invention is a resin composition which contains the fluorine-based resin (A), the matting agent (B) which is a thermoplastic resin insoluble in the fluorine-based resin (A), and the thermoplastic resin (C) soluble in the fluorine-based resin (A). Various additives may be blended in thermoplastic resin composition ($\alpha$), if necessary.

The thermoplastic resin composition ($\alpha$) preferably contains the matting agent (B) at 1 to 50 parts by mass and the thermoplastic resin (C) at 20 to 90 parts by mass relative to 100 parts by mass of the fluorine-based resin (A). It is more preferable that the matting agent (B) is contained at 1 to 30 parts by mass and the thermoplastic resin (C) is contained at 27 to 70 parts by mass relative to 100 parts by mass of the fluorine-based resin (A). By having the content of the matting agent (B) at 1 part by mass or more, it is possible to have a film to be obtained provided with favorable matte appearance. Furthermore, by having the content of the matting agent (B) at 50 parts by mass or less, the viscosity of the thermoplastic resin composition ($\alpha$) can be the viscosity which is suitable for extrusion molding. By having the content of the thermoplastic resin (C) at 20 parts by mass or more, exhibition of a matte property of a film to be obtained is stabilized. Furthermore, by having the content of the thermoplastic resin (C) at 90 parts by mass or less, it is possible to have favorable chemical resistance of a film to be obtained.

Examples of the various additives include various additives such as anti-oxidants, heat stabilizers, photostabilizers, plasticizers, lubricants, spreaders, anti-static agents, flame retardants, fillers, mattifying agents, processing auxiliary agents, impact resistance auxiliary agents, antibacterial agents, fungicides, foaming agents, mold lubricants, coloring agents, ultraviolet absorbers and thermoplastic polymers.

Examples of the anti-oxidant include phenol-based anti-oxidants, sulfur-based anti-oxidants and phosphorus-based anti-oxidants. Examples of the heat stabilizer include hindered phenol-based heat stabilizers, sulfur-based heat stabilizers and hydrazine-based heat stabilizers. Examples of the plasticizer include phthalic acid esters, phosphoric acid esters, fatty acid esters, aliphatic dibasic acid esters, oxybenzoic acid esters, epoxy compounds and polyesters. Examples of the lubricant include fatty acid esters, fatty acids, metal soaps, fatty acid amides, higher alcohols and paraffins. Examples of the anti-static agent include cationic anti-static agents, anionic anti-static agents, nonionic anti-static agent and zwitterionic anti-static agents. The additives may be used either singly or in combination of two or more types thereof.

Examples of the method for blending the additives include a method of kneading additives together with the fluorine-based resin (A), the matting agent (B), and the thermoplastic resin (C) using various kneaders. Examples of the kneader used for this method include single screw extruders, twin screw extruders, Banbury mixers and roll kneading machines. Furthermore, the number of kneading the fluorine-based resin (A), the matting agent (B), and the thermoplastic resin (C) is not limited, and a single stage or a multiple-stage kneading based on master batching can be carried out.

With regard to the shape of the thermoplastic resin composition ($\alpha$), there is a bulk shape product, a powder shape product, and a pellet shape product. Among them, the pellet shape product is preferable from the viewpoint of the handling property of a resin composition.

According to the first invention, it is preferable that the relationship of "MFR (A)>MFR (C)>MFR (B)" is satisfied when MFR of the fluorine-based resin (A), the matting agent (B), and the thermoplastic resin (C) at conditions including 250° C. and a load of 49 N is MFR (A), MFR (B), and MFR (C), respectively. By satisfying the relationship, the dispersion property of the matting agent (B) in a resin mixture of the fluorine-based resin (A) and the thermoplastic resin (C) is improved at the time of melt extrusion, and thus the matte stability of the film is enhanced.

[Solubility Parameter]

According to the first invention, because the matting agent (B) is a thermoplastic resin insoluble in the fluorine-based resin (A) and the thermoplastic resin (C) is a resin soluble in the fluorine-based resin (A), the solubility parameter value (SP value) of a resin is an important factor.

According to the first invention, if the SP value of a resin mixture of the fluorine-based resin (A) and the thermoplastic resin (C) is defined as SP (AC) and the SP value of the matting agent (B) is defined as SP (B), it is preferable to have "5.2<SP (B)–SP (AC)<6.6". As the value of "SP (B)–SP (AC)" is more than 5.2, favorable exhibition of a matte property of a film is obtained, and as the value of "SP (B)–SP (AC)" is less than 6.6, the dispersion property of the matting agent (B) in a resin mixture of the fluorine-based resin (A) and the thermoplastic resin (C) is improved, and thus the matte stability of the film is enhanced.

Meanwhile, the solubility parameter value refers to the value (σ) that is represented by the following Fedors equation.

$$\sigma = (E_v/v)^{1/2} = (\Sigma \Delta e_i / \Sigma \Delta v_i)^{1/2}$$ <Fedors equation>

σ: solubility parameter (unit: $J^{1/2}cm^{-3/2}$)
$E_v$: evaporation energy
V: molar volume
$\Delta e_i$: evaporation energy of each atom or atomic group
$\Delta v_i$: molar volume of each atom or atomic group The evaporation energy and molar volume of each atom or atomic group which is used for calculation by the above equation are based on "R. F. Fedors, Polym. Eng. Sci., 14, 147 (1974)". Furthermore, SP (AC) is represented by the following equation.

$$SP(AC) = \frac{SP(A) \times 100 W_A + SP(C) \times 100 W_A}{W_A + W_C}$$ [Mathematical equation 1]

$W_A$: % by mass of the fluorine-based resin (A)
$W_C$: % by mass of the thermoplastic resin (C)

$$W_A + W_C = 100$$

<Second Invention>

Next, explanations are given for the thermoplastic resin composition (β) as the second invention which contains the fluorine-based resin (A) and the acrylic matting agent (D). As for the fluorine-based resin (A) which is used for the second invention, the same resin as that of the thermoplastic resin composition (α) as the first invention can be mentioned.

[Acrylic Matting Agent (D)]

The acrylic matting agent (D) as a thermoplastic resin used for the second invention is a thermoplastic resin in which content ratio of acrylic acid alkyl ester unit is 50 to 100% by mass and content ratio of other monofunctional monomer units is 0 to 50% by mass when monofunctional monomer units in the monomer units constituting the resin (i.e., component derived from monofunctional monomer) is 100% by mass.

By using the acrylic matting agent (D) in which content ratio of acrylic acid alkyl ester unit is 50 to 100% by mass in the monofunctional monomer units constituting the resin, the solubility between the acrylic matting agent (D) and the solubilized product of the fluorine-based resin (A) and the thermoplastic resin (C) is lowered, and thus the film can be provided with a delicate matte property. Furthermore, the effect of preventing gum and having chemical resistance can be provided at the time of molding the resin composition to a film.

As for the other nonfunctional monomer, a known monofunctional monomer can be used. As for the content ratio of other nonfunctional monomer units which are different from the acrylic acid alkyl ester unit, it is preferable that acrylic acid alkyl ester unit is 60 to 100% by mass and the other nonfunctional monomer units are 0 to 40% by mass, and it is more preferable that the acrylic acid alkyl ester unit is 65 to 100% by mass and other acrylic acid alkyl ester units are 0 to 35% by mass.

Examples of the acrylic acid alkyl ester include acrylic acid $C_{1-10}$ alkyl ester such as methyl acrylic acid, ethyl acrylic acid, propyl acrylic acid, n-butyl acrylic acid, i-butyl acrylic acid, 2-ethylhexyl acrylic acid, or n-octyl acrylic acid. They may be used either singly or in combination of two or more types thereof. Among them, acrylic acid $C_{1-6}$ alkyl ester, in particular n-butyl acrylic acid, is preferable from the viewpoint of easiness of emulsion polymerization or the like.

Examples of the other monofunctional monomer include methacrylic acid alkyl ester such as methyl methacrylic acid, ethyl methacrylic acid, propyl methacrylic acid, n-butyl methacrylic acid, or i-butyl methacrylic acid; lower alkoxyalkyl acrylic acid such as 2-methoxyethyl acrylic acid; cyanoalkyl acrylic acid such as cyanoethyl acrylic acid; an acryl-based monomer such as acrylamide or (meth)acrylic acid; an aromatic vinyl monomer such as styrene or alkyl substituted styrene; and a vinyl cyanide monomer such as acrylonitrile or methacrylonitrile. They may be used either singly or in combination of two or more types thereof. Among the above, from the viewpoint of controlling the solubility of the acrylic matting agent (D) with the solubilized product of the fluorine-based resin (A) and the thermoplastic resin (C) and having an excellent effect of preventing gum at the time of film molding, methacrylic acid alkyl ester is preferable, and methacrylic acid $C_{1-6}$ alkyl ester such as methyl methacrylic acid is more preferable as the other monofunctional monomer.

Other than the aforementioned monofunctional monomer, a polyfunctional monomer which has, in one molecule, 2 or more double bonds that are copolymerizable with the monofunctional monomer may be included in addition to the aforementioned monofunctional monomer, if necessary. Examples of the polyfunctional monomer include alkylene glycol di(meth)acrylic acid such as ethylene glycol di(meth) acrylic acid, 1,3-butylene glycol di(meth)acrylic acid, 1,4-butylene glycol di(meth)acrylic acid, or propylene glycol di(meth)acrylic acid; polyvinyl benzene such as divinylbenzene or trivinylbenzene; a cyanurate-based monomer such as triallyl cyanurate or triallyl isocyanurate; α,β-unsaturated carboxylic acid such as allyl methacrylic acid; and allyl, metallyl, or crotyl ester of dicarboxylic acid. They may be used either singly or in combination of two or more types thereof. Among them, α,β-unsaturated carboxylic acid such as allyl methacrylic acid or allyl, metallyl, or crotyl ester of dicarboxylic acid is preferred as a polyfunctional monomer. Ratio of the polyfunctional monomer is, relative to 100 parts by mass of the monofunctional monomer, preferably 0.01 to 10 parts by mass, more preferably 0.05 to 5 parts by mass, and even more preferably 0.1 to 0.5 part by mass. From the viewpoint of having excellent matte property of a film, it is particularly preferably 0.01 to 0.25 part by mass.

A polymerization initiator may be included in the monomer component. Examples of the polymerization initiator include an azo compound such as 2,2'-azobisisobutyronitrile; an organic peroxide such as lauryl peroxide, benzoyl peroxide, t-butyl perbenzoate, t-butyl hydroperoxide, di-t-butyl peroxide, dicumyl peroxide, or cumen hydroperoxide; and a redox-based initiator [i.e., combination of an oxidizing agent like the organic peroxide with a reducing agent such as iron salt (e.g., ferrous sulfate), and if necessary, a chelating agent (ethylene diamine tetraacetate)]. They may be used either singly or in combination of two or more types thereof. Ratio of the polymerization initiator is, relative to 100 parts by mass of the monofunctional monomer in the monomer component, preferably 0.01 to 5 parts by mass, more preferably 0.05 to 3 parts by mass, and even more preferably 0.1 to 1 part by mass.

Furthermore, a chain transfer agent may be included in the monomer component. Examples of the chain transfer agent include alkyl mercaptan having carbon atom number of 2 to 20, mercaptocarboxylic acids (mercaptocarboxylic acid, mercaptocarboxylic acid alkyl ester, or the like), thiophenol, and carbon tetrachloride. They may be used either singly or in combination of two or more types thereof. Among them, alkyl mercaptan with carbon atom number of 6 to 10 is preferable, and n-octyl mercaptan is more preferable. Ratio of the chain transfer agent is, relative to total 100 parts by mass of the monofunctional monomer in monomer component, preferably 0.01 to 5 parts by mass, more preferably 0.05 to 3 parts by mass, and even more preferably 0.1 to 1 part by mass.

With regard to the acrylic matting agent (D), it is sufficient that the content ratio of acrylic acid alkyl ester unit in the monofunctional monomer units for constituting the polymer is 50 to 100% by mass, and it may be a core-shell type acrylic resin, for example. Examples of a resin for constituting the core of the core-shell type acrylic resin include a homopolymer of acrylic acid alkyl resin and a copolymer of acrylic acid alkyl ester and a copolymerizable monomer (e.g., vinyl-based monomer other than acrylic acid alkyl ester) [for example, the polymer (P13) described below]. Examples of a resin for constituting the shell include a homopolymer of methacrylic acid alkyl ester and a copolymer of methacrylic acid alkyl ester and a copolymerizable monomer (e.g., vinyl-based monomer other than methacrylic acid alkyl ester) [for example, the polymer (P14) described below].

Preferred acrylic matting agent (D) is a resin which is obtained by polymerizing the monomer component (m14) in the presence of the acrylic acid alkyl ester polymer (P13).

When the monofunctional monomer unit in the monomer component (m13) for constituting the aforementioned the acrylic acid alkyl ester polymer (P13) is 100% by mass, it is preferable that the acrylic acid alkyl ester unit is 80 to 100% by mass and other monofunctional monomer unit is 0 to 20% by mass. It is more preferable that the acrylic acid alkyl ester is 85 to 100% by mass and other monofunctional monomer unit 0 to 15% by mass. It is more preferable that the acrylic acid alkyl ester is 90 to 100% by mass and other monofunctional monomer unit is 0 to 10% by mass. By setting the content ratio of the acrylic acid alkyl ester unit present in 100% of the monofunctional monomer unit in the monomer component (m13) to be within the aforementioned range, the content ratio of the acrylic acid alkyl ester present in the monofunctional monomer unit in the monomer component (m14) unit described below can be controlled, and therefore desirable.

In the monomer component (m13), the aforementioned polyfunctional monomer may be contained. Content of the polyfunctional monomer is, from the viewpoint of having excellent matte property of a film to be obtained, preferably 0 to 0.6 part by mass, more preferably 0 to 0.5 part by mass, and even more preferably 0 to 0.4 parts by mass relative to the total amount of 100 parts by mass of the monofunctional monomer in the monomer component (m13).

When the monofunctional monomer in the monomer component (m14) is 100% by mass, it is preferable that the methacrylic acid alkyl ester is 80 to 100% by mass and other monofunctional monomer is 0 to 20% by mass. It is more preferable that the methacrylic acid alkyl ester is 85 to 100% by mass and other monofunctional monomer is 0 to 15% by mass. It is even more preferable that the methacrylic acid alkyl ester is 90 to 100% by mass and other monofunctional monomer is 0 to 10% by mass. By setting the content ratio of the methacrylic acid alkyl ester present in 100% of the monofunctional monomer unit in the monomer component (14) to be within the aforementioned range, glass transition temperature (Tg) of the polymer (P14) which is obtained by polymerizing the monomer component (m14) can be increased, and thus it is preferable from the viewpoint of the handling property of the acrylic matting agent (D).

Tg of the polymer (P14) which is obtained by polymerizing the monomer component (m14) is preferably 60° C. or higher, more preferably 70° C. or higher, and even more preferably 80° C. or higher from the viewpoint of having better handling property.

[Method for Producing Acrylic Matting Agent (D)]

As for the method for producing the acrylic matting agent (D), solution polymerization, suspension polymerization, emulsion polymerization, bulk polymerization, or the like can be mentioned. Among them, from the viewpoint of the easiness for designing the acrylic matting agent (D) to be obtained, emulsion polymerization is preferable.

Preferred examples of the emulsion polymerization include stepwise multi-stage emulsion polymerization. For example, there is method in which the monomer component (m14) is polymerized in the presence of the acrylic acid alkyl ester polymer (P13) that is polymerized from the monomer component (m13) containing an acrylic acid alkyl ester as a main component.

Specifically, it may be a method in which an emulsion prepared by mixing the monomer component (m13) for obtaining the acrylic acid alkyl ester polymer (P13), water, and a surface active agent is supplied to a reactor, polymerized therein, and the monomer component (m14) is respectively added in the order to the reactor for polymerization. The film produced by using the acrylic matting agent (D), which is obtained by the above method, is preferable in that it has a characteristic of having low number of fish eyes in the film.

Examples of the method for preparing an emulsion by mixing the monomer component (m13), water, and a surface active agent include the following methods (1) to (3).

(1) A method in which water and the monomer component (m13) are injected to a reactor, and then a surface active agent is added to the reactor.

(2) A method in which water and a surface active agent are injected to a reactor, and then the monomer component (m13) is added to the reactor.

(3) A method in which the monomer component (m13) and a surface active agent are injected to a reactor, and then water is added to the reactor.

Examples of the surface active agent include an anionic surface active agent (sulfonates or the like such as sodium dialkyl sulfosuccinate), a cationic surface active agent (quaternary ammonium salts or the like such as ammonium trimethyl alkyl), and a non-ionic surface active agent (ester type such as polyhydric alcohol fatty acid ester, ether type such as polyoxyethylene alkyl ether, or the like). They may be used either singly or in combination of two or more types thereof.

Each of the monomer component (m13) and/or the monomer component (m14) may be subjected to two or more divided polymerizations, if necessary. When the polymerization is carried out by two or more divided times, type and/or amount of the monofunctional monomer in the monomer component may be the same or different from each other.

It is also possible that, after polymerizing the monomer component (m14), other monomer components are additionally polymerized. In that case, an emulsion and suspension polymerization method converted into a suspension polymerization system can be used. The temperature for polymerizing the monomer components is 50 to 100° C., and preferably 60 to 90° C. or so.

If necessary, latex of the acrylic matting agent (D) which is obtained by emulsion polymerization can be processed using a filtration device provided with a filtering material. Such filtering process is used for removing scales generated during the polymerization from the latex of the acrylic matting agent (D) or removing impurities that are present in a polymerization raw material or introduced from an outside during the polymerization.

Examples of a method for recovering the acrylic matting agent (D) from latex of the acrylic matting agent (D) include an aggregation method based on base precipitation or acid precipitation, spray drying method, and a freeze drying method.

In a case in which the acrylic matting agent (D) is recovered by an aggregation method based on base precipitation using metal salt, it is preferable that the content of residual metal in the acrylic matting agent (D) which is finally obtained is preferably 800 ppm or less. Note that less content of the residual metal is more preferable.

[Thermoplastic Resin Composition (β)]

The thermoplastic resin composition (β) of the present invention is a resin composition which contains the aforementioned fluorine-based resin (A) and the acrylic matting agent (D). Content ratio of the fluorine-based resin (A) and the acrylic matting agent (D) in the thermoplastic resin composition (β) is preferably set from the viewpoint of the matte appearance and chemical resistance of a film which is obtained by molding the resin composition to a film shape. From such point of view, when the total of the fluorine-based resin (A) and the acrylic matting agent (D) is 100% by mass, it is preferable that the fluorine-based resin (A) is 70 to 99% by mass and the acrylic matting agent (D) is 1 to 30% by mass. It is more preferable that the fluorine-based resin (A) is 75 to 99% by mass and the acrylic matting agent (D) is 1 to 25% by mass. It is even more preferable that the fluorine-based resin (A) is 80 to 99% by mass and the acrylic matting agent (D) is 1 to 20% by mass.

For the purpose of improving the matte appearance and/or chemical resistance, one or more kinds of other resin such as an ionomer resin, a polyolefin-based resin, a silicone-based resin, an epoxy-based resin, or a polyurethane-based resin may be contained in the thermoplastic resin composition (β). As for the other resin, an acrylic resin having composition different from the acrylic matting agent (D) (i.e., acrylic resin having acrylic acid alkyl ester content ratio of less than 50% by mass when the monofunctional monomer in the monomer component for constituting the resin is 100% by mass) may be also used.

Use of various additives, the method for blending additives, and the shape of the thermoplastic resin composition (β) are the same as those of the thermoplastic resin composition (α) as the first invention described above.

<Third Invention>

Next, the thermoplastic resin composition (γ) containing the acrylic matting agent (E), the fluorine-based resin (A), and the acrylic matting agent (E), which corresponds to the third invention group, is explained.

[Acrylic Matting Agent (E)]

The acrylic matting agent (E) according to the third invention is a polymer which has 21 to 49% by mass of the (meth)acrylic acid alkyl ester (b6) unit having at least one alkyl group which is selected from a group consisting of a linear alkyl group with 10 to 30 carbon atoms, a branched alkyl group with 10 to 30 carbon atoms, and a cyclic alkyl group with 10 to 30 carbon atoms and may have a substituent and 51 to 79% by mass (total of the monofunctional monomer unit is 100% by mass) of other monofunctional monomer (b7) unit (i.e., total of the monofunctional monomer units is 100% by mass).

In the explanations that are given below, the (meth)acrylic acid alkyl ester (b6) unit having at least one alkyl group which is selected from a group consisting of a linear alkyl group with 10 to 30 carbon atoms, a branched alkyl group with 10 to 30 carbon atoms, and a cyclic alkyl group with 10 to 30 carbon atoms and may have a substituent may be referred to as "acrylic monomer (b6)" and the other monofunctional monomer (b7) may be referred to as "monofunctional monomer (b7)"

As the content ratio of the acrylic monomer (b6) unit in the acrylic matting agent (E) is 21% by mass or more, it becomes possible for a film obtained from the thermoplastic resin composition (γ) to be provided with delicate matte appearance, and an occurrence of gum generated during molding of the thermoplastic resin composition (γ) to a film shape is suppressed. Furthermore, as the content ratio of the acrylic monomer (b6) unit in the acrylic matting agent (E) is 49% by mass or less, it becomes easier to set the glass transition temperature (Tg) of the acrylic matting agent (E) to 0° C. or higher so that the handling property is improved. Meanwhile, according to the present invention, the glass transition temperature is calculated using only the monofunctional monomer without using the polyfunctional monomer which will be described later.

As for the monofunctional monomer (b7), a known monofunctional monomer can be used. The content ratio (% by mass) of the acrylic monomer (b6) unit and the other monofunctional monomer (b7) unit in the acrylic matting agent (E) is preferably "24 to 46:76 to 54", and more preferably "27 to 43:73 to 57".

As for the acrylic monomer (b6), examples of the (meth)acrylic acid alkyl ester having a linear alkyl group with 10 to 30 carbon atoms include decyl (meth)acrylic acid, dodecyl (meth)acrylic acid, tridecyl (meth)acrylic acid, cetyl (meth)acrylic acid, myristyl (meth)acrylic acid, stearyl (meth)acrylic acid, and behenyl (meth)acrylic acid.

As for the acrylic monomer (b6), examples of the (meth)acrylic acid alkyl ester having a branched alkyl group with 10 to 30 carbon atoms include isodecyl (meth)acrylic acid, isomyristyl (meth)acrylic acid, and isostearyl (meth)acrylic acid.

As for the acrylic monomer (b6), examples of the (meth)acrylic acid alkyl ester having a cyclic alkyl group with 10 to 30 carbon atoms include isobornyl (meth)acrylic acid, adamantyl (meth)acrylic acid, dicyclopentanyl (meth)acrylic acid, and 4-t-butylcyclohexyl (meth)acrylic acid.

Among them, from the viewpoint of easy availability and the heat resistance of the acrylic matting agent (E) to be obtained, (meth)acrylic acid alkyl ester having a linear alkyl group with 10 to 30 carbon atoms is preferable. In particular, from the viewpoint of the easy handling property, decyl (meth)acrylic acid, dodecyl (meth)acrylic acid, tridecyl (meth)acrylic acid, cetyl (meth)acrylic acid, and myristyl (meth)acrylic acid, which are a liquid at 25° C., are more preferable. The acrylic monomer (b6) may be used either singly or in combination of two or more types thereof.

Examples of the monofunctional monomer (b7) include (meth)acrylic acid alkyl ester such as methyl (meth)acrylic acid, ethyl (meth)acrylic acid, propyl (meth)acrylic acid, n-butyl (meth)acrylic acid, or i-butyl (meth)acrylic acid; (meth)acrylic monomer such as lower alkoxy (meth)acrylic acid, cyanoethyl (meth)acrylic acid, (meth)acrylic acid amide, or (meth)acrylic acid; an aromatic vinyl monomer such as styrene or alkyl substituted styrene; and a vinyl cyanide monomer such as acrylonitrile or methacrylonitrile. They may be used either singly or in combination of two or more types thereof.

In the monomer component for producing the acrylic matting agent (E), a polyfunctional monomer (b8) may be included other than the aforementioned monofunctional monomer. Examples of the polyfunctional monomer (b8) include alkylene glycol di(meth)acrylic acid such as ethylene glycol di(meth)acrylic acid, 1,3-butylene glycol di(meth)acrylic acid, 1,4-butylene glycol di(meth)acrylic acid, or propylene glycol di(meth)acrylic acid; polyvinyl benzene such as divinylbenzene or trivinylbenzene; a cyanurate-based monomer such as triallyl cyanurate or triallyl isocyanurate; α,β-unsaturated carboxylic acid such as allyl methacrylic acid; and allyl, metallyl, or crotyl ester of dicarboxylic acid. They may be used either singly or in combination of two or more types thereof.

Use amount of the polyfunctional monomer (b8) is, relative to total 100 parts by mass of the monofunctional monomer, preferably 0 to 0.50 part by mass. Namely, it is preferable that the acrylic matting agent (E) contains, relative to total 100 parts by mass of the monomer units of the acrylic monomer (b6) unit and the monofunctional monomer (b7) unit, 0 to 0.50 part by mass of the polyfunctional monomer (b8) unit. By preparing the polymerizable raw material as a monomer mixture blended with the polyfunctional monomer (b8), it becomes easier to control the solubility of the acrylic matting agent (E), which is obtained by polymerizing the monomer mixture, in the fluorine-based resin (A). Furthermore, as a result, it becomes easier to have a film or the like, which is obtained from the composition containing the fluorine-based resin (A) and the acrylic matting agent (E), provided with the effect of gum prevention and matte appearance. Content of the polyfunctional monomer (b8) unit is more preferably 0.01 to 0.48 part by mass, and even more preferably 0.05 to 0.46 part by mass.

Content ratio of the acetone insolubles resulting from acetone solvent extraction of the acrylic matting agent (E) obtained by using the polyfunctional monomer (b8) is preferably 10 to 90% by mass. As the content ratio of acetone insolubles in the acrylic matting agent (E) is prepared to be 10% by mass or more, it becomes easier to obtain a molded article like film with matte appearance from the resin composition that is obtained by adding the acrylic matting agent (E) to the fluorine-based resin (A) which will be described later. Furthermore, by preparing the content ratio of the acetone insoluble to be 90% by mass or less, it becomes easier to suppress a gum generated during molding of the resin composition or foreign materials derived from the acrylic matting agent (E). Content ratio of the acetone insolubles is preferably 15 to 85% by mass, and more preferably 20 to 80% by mass.

Meanwhile, the method for measuring the "acetone insolubles" in the acrylic matting agent (E), and the method for recovering the "acetone solubles" will be described later.

Molecular weight of the acetone solubles in the acrylic matting agent (E) is 30,000 to 5,000,000 in terms of mass average molecular weight (Mw). If Mw is 30,000 or more, it is possible to obtain a molded article like film with desired matte appearance from the resin composition which is obtained by adding the acrylic matting agent (E) to the fluorine-based resin (A). Furthermore, if Mw is 5,000,000 or less, a delicate matte property can be provided while the solubility of the acrylic matting agent (E) with the fluorine-based resin (A) is not significantly lowered. Mw is more preferably 40,000 to 4,000,000, and even more preferably 50,000 to 3,000,000.

The molecular weight dispersity (Mw/Mn) obtained by measurement of the molecular weight of acetone solubles is preferably 4.5 or less. As the molecular weight dispersity is 4.5 or less, the acrylic matting agent (E) with relatively even molecular weight is obtained, and thus it becomes easier to maintain even matte appearance of a molded article which is obtained from the thermoplastic resin composition (γ). The molecular weight dispersity is more preferably 4.0 or less, and even more preferably 3.5 or less.

As for the method for producing the acrylic matting agent (E), solution polymerization, suspension polymerization, emulsion polymerization, bulk polymerization, or the like can be mentioned. Among them, from the viewpoint of the easiness of polymerization process and easiness of recovery of a polymer to be obtained, it is preferable to use suspension polymerization.

Suspension polymerization can be carried out in a reaction vessel with a function of controlling polymerization temperature and a stirring function by using a monofunctional monomer, a polyfunctional monomer, a polymerization initiator, a chain transfer agent, a dispersing agent, a dispersion aid, and water. As for the polymerization initiator, a known initiator can be used, and examples thereof include an azo-based initiator, a peroxide-based initiator, and a redox-based initiator in which a peroxide-based initiator is combined with an oxidizing agent·a reducing agent.

Examples of the chain transfer agent include alkyl mercaptan having carbon atom number of 2 to 20 such as n-octyl mercaptan, mercapto acids, thiophenol, and carbon tetrachloride. They may be used either singly or in combination of two or more types thereof.

The polymerization temperature is 40 to 120° C., for example. As for the dispersing agent, a known agent may be used and examples thereof include polyvinyl alcohol, potassium methacrylic acid-methyl methacrylic acid copolymer. As for the dispersion aid, a known aid may be used, and examples thereof include sodium sulfate and manganese sulfate.

The acrylic matting agent (E) obtained by suspension polymerization has a bead-like shape which is close to a true sphere. From the viewpoint of the handling property of the acrylic matting agent (E), the average particle diameter thereof is preferably 10 to 1000 μm.

[Thermoplastic Resin Composition (γ)]

The thermoplastic resin composition (γ) of the present invention is a resin composition which contains the aforementioned fluorine-based resin (A) and the acrylic matting agent (E). With regard to the blending amount of the fluorine-based resin (A) and the acrylic matting agent (E) in the thermoplastic resin composition (γ), it is preferable that the acrylic matting agent (E) is contained at 1 to 100 parts by mass relative to 100 parts by mass of the fluorine-based resin (A). As the acrylic matting agent (E) is contained at 1 to 100 parts by mass relative to 100 parts by mass of the fluorine-based resin (A), it becomes possible to have matte appearance of a film which is obtained by molding the resin composition to a film shape. It is more preferable that acrylic matting agent (E) is at 1 to 85 parts by mass relative to 100 parts by mass of the fluorine-based resin (A), and it is more preferably 1 to 70 parts by mass.

Use of various additives, the method for blending additives, and the shape of the thermoplastic resin composition (γ) are the same as those of the thermoplastic resin composition (α) as the first invention described above.

<Fourth Invention>

Next, the thermoplastic resin composition (δ) containing the crosslinked acrylic matting agent (F), the fluorine-based resin (A), the crosslinked acrylic matting agent (F), and other resin (G) as an optionally added component, which corresponds to the fourth invention group, is explained.

[Crosslinked Acrylic Matting Agent (F)]

The monomer mixture (b9) as a raw material of the crosslinked acrylic matting agent (F) is a monomer mixture which consists of 50.0 to 99.9% by mass of a (meth)acrylic acid alkyl ester (b10) (hereinbelow, it may be also referred to as a "monofunctional monomer (b10)"), 0 to 49.9% by mass of a monofunctional monomer (b11) other than (meth) acrylic acid ester (hereinbelow, it may be also referred to as a "monofunctional monomer (b11)"), and 0.1 to 3.0% by mass of a polyfunctional monomer (b12) which is copolymerizable with those two monomers (hereinbelow, it may be also referred to as a "polyfunctional monomer (b12)").

By using 0.1% by mass or more of the polyfunctional monomer (b12) as the monomer mixture (b9), the solubility between the crosslinked acrylic matting agent (F) and the fluorine-based resin (A) is lowered so that the matte property can be provided. By using 3.0% by mass or less of the polyfunctional monomer (b12), an occurrence of gum at the time of molding the thermoplastic resin composition (δ) containing the fluorine-based resin (A) and the crosslinked acrylic matting agent (F) can be suppressed. As a result, an occurrence of gum at the time of molding the thermoplastic resin composition (δ) containing the fluorine-based resin (A) and the crosslinked acrylic matting agent (F) can be suppressed and a molded article can be provided with delicate matte property and chemical resistance. Content ratio of the polyfunctional monomer (b12) in the monomer component (b9) is preferably 0.1 to 2.5% by mass, and more preferably 0.1 to 2.0% by mass.

Particle diameter of the crosslinked acrylic matting agent (F) is preferably 1 to 30 μm. By having the particle diameter of 1 μm or more, a molded article to be obtained can be provided with matte appearance, and by having the particle diameter of 30 μm or less, it becomes possible to give a delicate matte property to a molded article. The particle diameter is more preferably 1 to 20 μm, and even more preferably 1 to 10 μm.

Examples of the monofunctional monomer (b10) include methyl (meth)acrylic acid, ethyl (meth)acrylic acid, propyl (meth)acrylic acid, n-butyl (meth)acrylic acid, i-butyl (meth)acrylic acid, t-butyl (meth)acrylic acid, 2-ethylhexyl (meth)acrylic acid, cyclohexyl (meth)acrylic acid, dodecyl (meth)acrylic acid, tridecyl (meth)acrylic acid, stearyl (meth)acrylic acid, isobornyl (meth)acrylic acid, benzyl (meth)acrylic acid, phenyl (meth)acrylic acid, glycidyl (meth)acrylic acid, 2-hydroxyethyl (meth)acrylic acid, hydroxypropyl (meth)acrylic acid, 2-methoxyethyl (meth) acrylic acid, 2-ethoxyethyl (meth)acrylic acid, and trifluoroethyl (meth)acrylic acid.

As for the monofunctional monomer (b10), those having high hydrophobicity like n-butyl (meth)acrylic acid, i-butyl (meth)acrylic acid, t-butyl (meth)acrylic acid, 2-ethylhexyl (meth)acrylic acid, and cyclohexyl (meth)acrylic acid are preferable because an occurrence of aggregated particles can be suppressed at the time of producing the crosslinked acrylic matting agent (F) described below. They may be used either singly or in combination of two or more types thereof.

Examples of the monofunctional monomer (b11) include a (meth)acrylic monomer such as lower alkoxy acrylic acid, cyanoethyl acrylic acid, acrylamide, or (meth)acrylic acid; an aromatic vinyl monomer such as styrene or alkyl substituted styrene; and a vinyl cyanide monomer such as acrylonitrile or methacrylonitrile. They may be used either singly or in combination of two or more types thereof.

Examples of the polyfunctional monomer (b12) include alkylene glycol di(meth)acrylic acid such as ethylene glycol di(meth)acrylic acid, 1,3-butylene glycol di(meth)acrylic acid, 1,4-butylene glycol di(meth)acrylic acid, or propylene glycol di(meth)acrylic acid; polyvinyl benzene such as divinylbenzene or trivinylbenzene; a cyanurate-based monomer such as triallyl cyanurate or triallyl isocyanurate; α,β-unsaturated carboxylic acid such as allyl methacrylic acid; and allyl, metallyl, or crotyl ester of dicarboxylic acid. As for the polyfunctional monomer (b12), di(meth)acrylic acid alkylene glycol such as ethylene glycol di(meth)acrylic acid, 1,3-butylene glycol di(meth)acrylic acid, 1,4-butylene glycol di(meth)acrylic acid, or propylene glycol di(meth)acrylic acid is preferable from the viewpoint of easy availability and suppression of an occurrence of gum at the time of molding the thermoplastic resin composition (γ). They may be used either singly or in combination of two or more types thereof.

As for the method for producing the crosslinked acrylic matting agent (F) of the fourth invention group, a known polymerization method can be used, and examples thereof include emulsion polymerization, soap-free polymerization, seed emulsion polymerization in which polymer particles obtained by said methods are used as a seed, swelling polymerization, 2-step swelling polymerization, and microsuspension polymerization. Among them, microsuspension polymerization is preferable.

Microsuspension polymerization is a method in which a mixture consisting of a monomer, a surface active agent, water, and a polymerization initiator is enforced to emulsification by using a homogenizer, a homo mixer, or the like to yield fine liquid droplets with particle diameter of 1.0 to 100 μm and the mixture is then heated to decompose the polymerization initiator dissolved in the liquid droplets and to generate radicals for having a progress of radical polymerization. According to this polymerization, latex in which polymer particles of the crosslinked acrylic matting agent (F) are dispersed can be obtained. Use amount of water is preferably 50 to 1000 parts by mass relative to 100 parts by mass of the monomer component (b9).

As for the surface active agent, a known one can be suitably selected and used. Furthermore, any one of a non-reactive surface active agent and a reactive surface active agent is acceptable. They may be used either singly or in combination of two or more types thereof.

Examples of the non-reactive surface active agent include sodium alkyl sulfate, sodium alkyl sulfonate, and sodium alkyl phosphate, which are an anionic surface active agent. Examples of the commercially available product thereof include "PHOSPHANOL RS610NA" manufactured by TOHO Chemical Industry Co., Ltd.

Examples of the reactive surface active agent include polyoxyethylene alkyl ether having a polymerizable functional group, a sulfonate or a phosphate thereof; polyoxyethylene phenyl ether having a polymerizable functional group, a sulfonate or a phosphate thereof; fatty acid alkyl sulfate having a polymerizable functional group; alkyl sulfonic acid having a polymerizable functional group, or a salt thereof; and alkyl phosphoric acid having a polymerizable functional group, or a salt thereof. Examples of the commercially available product thereof include "LATEMUL PD-104" and "LATEMUL PD-420" manufactured by Kao Corporation.

Furthermore, it is also possible to add a dispersion stabilizer to a polymerization reaction vessel to stabilize the dispersion state of polymer particles. As for the dispersion stabilizer, a known one can be suitably selected and used. Examples of the dispersion stabilizer include polyvinyl alcohol, and polymerization degree or saponification degree of polyvinyl alcohol can be suitably selected and used. Examples of the commercially available product thereof include KURARAY POVAL "PVA105" and "PVA205" manufactured by KURARAY CO., LTD.

In the monomer mixture (b9), a chain transfer agent may be contained. Examples of the chain transfer agent include alkyl mercaptan having carbon atom number of 2 to 20 such as n-octyl mercaptan, mercapto acids, thiophenol, and carbon tetrachloride. They may be used either singly or in combination of two or more types thereof.

As for the polymerization initiator used for polymerization of the monomer mixture (b9), a known initiator can be suitable selected and used. In particular, an oil-soluble polymerization initiator which is soluble in the monomer mixture (b9) and has water solubility of less than 0.5% by mass is preferable. When the water solubility is less than 0.5% by mass, there is no possibility of having co-occurrence of emulsion polymerization during the micro suspension polymerization described below, and therefore desirable.

Examples of the polymerization include an azo-based radical polymerization initiator such as azonitrile, azoamide, cyclic azoamidine, azoamidine, or a macro azo compound; and a peroxide-based radical polymerization initiator such as ketone peroxide, peroxy ketal, hydroperoxide, dialkyl peroxide, diacyl peroxide, peroxy ester, or peroxy dicarbonate. They may be used either singly or in combination of two or more types thereof.

Use amount of the polymerization initiator is preferably 0.01 to 1.0 part by mass relative to 100 parts by mass of the monomer mixture (b9). As the use amount of the polymerization initiator is 0.01 part by mass or more, the polymerization initiator can sufficiently function to yield fast polymerization rate and less amount of non-reacted monomers, and therefore desirable. Furthermore, as it is 1.0 part by mass or less, abrupt generation of polymerization heat does not occur, and therefore desirable.

As a method for recovering the polymer particles from latex in which polymer particles are dispersed, aggregation based on base precipitation or acid precipitation, spray drying, and freeze drying can be mentioned. According to those methods, the polymer particles can be recovered as powder. In particular, the polymer particles are preferably the particles which have been prepared in powder by spray drying. As for the method for spray drying, a known method such as a two-stream nozzle type, a pressure nozzle type, or a rotating disc type can be used. The exit temperature of the drying chamber for spray drying is preferably 50 to 120° C., and more preferably 60 to 100° C.

[Other Resin (G) as Optionally Added Component]

Other resin (G) is blended for the purpose of improving the matte appearance and chemical resistance, or weather resistance of a molded article. Examples of the other resin (G) include an acrylic resin, an ionomer resin, a polyolefin-based resin, a silicone-based resin, an epoxy-based resin, and a polyurethane-based resin. Each of them may be used either singly or in combination of two or more types thereof. From the viewpoint of improving the weather resistance of a molded article, it is preferable to blend an acrylic resin.

[Thermoplastic Resin Composition ($\delta$)]

The thermoplastic resin composition ($\delta$) according to the fourth invention group is a resin composition which contains the crosslinked acrylic matting agent (F) and the fluorine-based resin (A). With regard to the content ratio of each resin in 100% by mass of the thermoplastic resin composition ($\delta$), the fluorine-based resin (A) is 70 to 99% by mass and the crosslinked acrylic matting agent (F) is 1 to 30% by mass. By having the content of the fluorine-based resin (A) at 70 to 99% by mass, it is possible to give chemical resistance to a molded article which is obtained from the thermoplastic resin composition ($\delta$). By having the crosslinked acrylic matting agent (F) at 1 to 30% by mass, it is possible to give matte appearance to a molded article which is obtained from the thermoplastic resin composition ($\delta$).

With regard to the ratio between the fluorine-based resin (A) and the crosslinked acrylic matting agent (F), it is preferable that the fluorine-based resin (A) is 75 to 99% by mass and the crosslinked acrylic matting agent (F) is 1 to 25% by mass. It is more preferable that the fluorine-based resin (A) is 80 to 99% by mass and the crosslinked acrylic matting agent (F) is 1 to 20% by mass.

To the thermoplastic resin composition ($\delta$), various additives may be added, if necessary. Type of various additives, the method for blending additives, and the shape of the thermoplastic resin composition ($\delta$) are the same as those of the thermoplastic resin composition ($\alpha$) as the first invention described above.

<Fifth Invention>

[Fluorine-Based Matte Film]

The fluorine-based matte film as the fifth invention is a matte film which is obtained by molding any one of the thermoplastic resin composition ($\alpha$), ($\beta$), ($\gamma$), and ($\delta$) described above. This fluorine-based matte film has an excellent matte property and excellent chemical resistance. Because the thermoplastic resin composition ($\alpha$), ($\beta$), ($\gamma$), and ($\delta$) have a very small deviation in matte appearance at the time of producing a film, the productivity is good at the time of obtaining the film and the occurrence of gum can be prevented when the film is produced. Accordingly, the film to be obtained is a film which has very few appearance defects that are derived from gum.

According to the fluorine-based matte film of the present invention, 60 degree surface gloss which is measured based on JIS Z8741 or ISO2813 is preferably 5 to 80. Meanwhile, the direction of incident light is parallel to the flow direction at the time of film production. As the 60 degree surface gloss increases, higher gloss is exhibited, and as the 60 degree surface gloss decreases, the degree of matteness (i.e., matte feel) increases. For having favorable matte appearance of a film, the 60 degree surface gloss is preferably 5 to 70, and more preferably 7 to 65. Meanwhile, the 60 degree surface gloss can be measured by using a conventionally used gloss meter, for example, a portable gloss meter (manufactured by KONICA MINOLTA SENSING INC., trade name: GM-268). Standard deviation of the 60 degree surface gloss is preferably 6 or less from the viewpoint of having favorable yield due to increased production stability. It is more preferably 3 or less, and even more preferably 2 or less.

From the viewpoint of having favorable handling property and lamination property of a film, and favorable film forming property for molding to a film shape and processability, thickness of the fluorine-based matte film is preferably 5 to 500 μm, and more preferably 5 to 300 μm.

With regard to the light transmittance of the fluorine-based matte film, it is preferable that the total light transmittance measured based on JIS K7361-1 is 80% or higher. By having the total light transmittance of 80% or higher, the decorative property of a substrate surface or the decorative property of a printing layer formed between a layered film and surface of various substrates is not impaired when the fluorine-based matte film is laminated on a surface of various substrates such as plastics, glass, slate, rubber, metal plate, or wood plate, and therefore desirable. The total light transmittance is more preferably 83% or more, and even more preferably 85% or more.

Haze of the fluorine-based matte film is preferably 90% or less from the viewpoint of beauty of the appearance of a matte film.

Examples of the method for producing the fluorine-based matte film include a melt extrusion method such as a melt casting method, a T die method, or an inflation method; and a calendaring method. Among them, the T die method is preferable from the viewpoint of having favorable economic efficiency. If the fluorine-based matte film is formed as a film by a T die method using an extruder or the like and wound around a tube-like subject like paper tube using a winding device, it can be prepared as a roll-shaped product. Furthermore, if necessary, an elongation process like single screw elongation (in machine direction of horizontal direction (i.e., direction perpendicular to machine direction)), twin screw elongation (stepwise twin screw elongation, simultaneous twin screw elongation), or the like that are based on a conventional elongation method can be included during the film forming process. In case of having melt extrusion, it is preferable that, to remove a nucleus or a foreign material to cause poor appearance, the resin composition in a melt state is extruded while it is being filtered through a screen mesh with size of 200 mesh or higher.

Furthermore, on a surface of the fluorine-based matte film, a fine structure may be formed, if necessary. Examples of a method for forming a fine structure include a heat transfer method and an etching method. Between them, the heat transfer method in which a mold having a fine structure is heated and the heated mold is pressed on a surface of a film to form a fine structure on a surface of the film is preferable from the viewpoint of productivity and also economic efficiency. Examples of the heat transfer method include the following methods (1) and (2).

(1) A mold with fine structure is pressed under heating on a fluorine-based matte film which has been cut from a roll-shaped product so that the fine structure is heat-transferred to a single sheet.

(2) Continuous sheeting method in which, by using a nip roll, the fluorine-based matte film which has been wound to a roll-shaped product is inserted to a mold having a fine structure on a heated belt followed by pressing to have heat-transfer of the fine structure on a surface of the fluorine-based matte film.

As a method for producing the mold with a fine structure, a sand blast method, an etching method, and an electric discharge processing method can be mentioned.

[Layered Body]

The fluorine-based matte film can be layered to each other, or it can be layered onto other substrate. As for the substrate for producing a layered body, a film, a sheet, a molded article with three-dimensional structure can be used.

<Sixth Invention>

[Fluorine-Based Matte Layered Film]

The fluorine-based matte layered film as the sixth invention is a layered film in which any resin layer of the thermoplastic resin composition (α), (β), (γ), and (δ) and an acrylic resin layer are laminated. It is preferably a film in which the fluorine-based matte film obtained by molding any one of the thermoplastic resin composition (α), (β), (γ), and (δ) to a film shape and the acrylic resin film obtained by molding an acrylic resin (H) to a film shape are laminated. According to lamination with an acrylic resin film obtained by molding the acrylic resin (H), the molding property of a layered film or visibility of a decorated layer is improved, and therefore desirable. Other than the acrylic resin film obtained by molding the acrylic resin (H), a film consisting of other resins such as an ionomer resin, a polyolefin-based resin, a silicone-based resin, an epoxy-based resin, or a polyurethane-based resin may be also used.

Thickness ratio between the fluorine-based resin layer and the acrylic resin in the fluorine-based matte layered film is, from the viewpoint of chemical resistance, cost, surface resistance, transparency, matte appearance, and printing suitability of the fluorine-based matte layered film, preferably 1/99 to 20/80, more preferably 2/98 to 15/85, and even more preferably 3/97 to 10/90 in terms of the fluorine-based resin layer/the acrylic resin layer.

The 60 degree surface gloss of the fluorine-based matte layered film of the present invention is preferably 5 to 80. For having favorable matte appearance of the film, the 60 degree surface gloss is more preferably 5 to 70, and even more preferably 7 to 65. Standard deviation of the 60 degree surface gloss is preferably 6 or less from the viewpoint of having favorable yield due to increased production stability. It is more preferably 3 or less, and even more preferably 2 or less.

With regard to the light transmittance of the layered film, it is preferable that the total light transmittance measured based on JIS K7361-1 is 80% or higher. By having the total light transmittance of 80% or higher, the decorative property of a substrate surface or the decorative property of a printing layer formed between a layered film and surface of various substrates is not impaired when the layered film is laminated on a surface of various substrates such as plastics, glass, slate, rubber, metal plate, or wood plate, and therefore desirable. The total light transmittance is more preferably 83% or more, and even more preferably 85% or more.

Haze of the fluorine-based matte layered film is preferably 90% or less from the viewpoint of beauty of the appearance of the fluorine-based layered film. Furthermore, on the fluorine-based matte layered film, it is possible to form a fine structure which has been described in the section related to a matte film.

[Acrylic Resin (H)]

As the acrylic resin (H), the thermoplastic polymer (C-1) which has the aforementioned methacrylic acid alkyl ester unit as a main component or the rubber-containing polymer (R2) which will be described later can be used. They may be used either singly or in combination of two or more types thereof.

With regard to content of the thermoplastic polymer (C-1) and the rubber-containing polymer (R2) in the acrylic resin (H), it is preferable that the thermoplastic polymer (C-1) is 0 to 100 parts by mass and the rubber-containing polymer (R2) is 0 to 100 parts by mass. It is more preferable that the thermoplastic polymer (C-1) is 10 to 90 parts by mass and the rubber-containing polymer (R2) is 10 to 90 parts by mass. It is even more preferable that the thermoplastic polymer (C-1) is 20 to 80 parts by mass and the rubber-containing polymer (R2) is 20 to 80 parts by mass.

The rubber-containing polymer (R2) is a rubber-containing polymer which is obtained by polymerizing a monomer component containing methacrylic acid alkyl ester as an essential component in the presence of a rubber polymer (R1) which is obtained by polymerizing a monomer component containing acrylic acid alkyl ester and a polyfunctional monomer as an essential component.

Examples of the acrylic acid alkyl ester as a raw material of the rubber polymer (R1) include methyl acrylic acid, ethyl acrylic acid, propyl acrylic acid, n-butyl acrylic acid, i-butyl acrylic acid, 2-ethylhexyl acrylic acid, and n-octyl acrylic acid.

Examples of the polyfunctional monomer to be a raw material of the rubber polymer (R1) include alkylene glycol di(meth)acrylic acid such as ethylene glycol di(meth)acrylic acid, 1,3-butylene glycol di(meth)acrylic acid, 1,4-butylene glycol di(meth)acrylic acid, or propylene glycol di(meth) acrylic acid; polyvinyl benzene such as divinylbenzene or trivinylbenzene; a cyanurate-based monomer such as triallyl cyanurate or triallyl isocyanurate; α,β-unsaturated carboxylic acid such as allyl methacrylic acid; and allyl, metallyl, or crotyl ester of dicarboxylic acid.

For the rubber polymer (R1), other monomers can be also used as a raw material. Examples of the other monomers include alkyl methacrylic acid such as methyl methacrylic acid, ethyl methacrylic acid, propyl methacrylic acid, n-butyl methacrylic acid, or i-butyl methacrylic acid; an acrylic monomer such as lower alkoxy acrylic acid, cyanoethyl acrylic acid, acrylamide, or (meth)acrylic acid; an aromatic vinyl monomer such as styrene or alkyl substituted styrene; and a vinyl cyanide monomer such as acrylonitrile or methacrylonitrile.

As for the method for producing the rubber-containing polymer (R2), solution polymerization, suspension polymerization, emulsion polymerization, bulk polymerization, or the like can be mentioned. Among them, from the viewpoint of the easiness for designing the rubber-containing polymer (R2) to be obtained, emulsion polymerization is preferable. Preferred examples of the emulsion polymerization include stepwise multi-stage emulsion polymerization.

For a case in which the rubber-containing polymer (R2) is produced by stepwise multi-stage emulsion polymerization, it is preferable that the content of acrylic acid alkyl ester is 80 to 100% by mass and content of other monofunctional monomer is 0 to 20% by mass when the monofunctional monomer in monomer component which contains acrylic acid alkyl ester and a polyfunctional monomer as an essential component is 100% by mass. It is more preferable that the content of acrylic acid alkyl ester is 85 to 100% by mass and content of other monofunctional monomer is 0 to 15% by mass. It is even more preferable that the content of acrylic acid alkyl ester is 90 to 100% by mass and content of other monofunctional monomer is 0 to 10% by mass.

Furthermore, the content of polyfunctional monomer is preferably 0.1 to 10 parts by mass relative to 100 parts by mass of the monofunctional monomer. By having the polyfunctional monomer at 0.1 to 10 parts by mass, it is possible to give flexibility to a film to be obtained. It is more preferably 0.3 to 8 parts by mass, and even more preferably 0.5 to 6 parts by mass.

It is preferable that content ratio of the methacrylic acid alkyl ester in the monomer component (100% by mass) which contains the methacrylic acid alkyl ester as an essential component is 70 to 100% by mass and content ratio of other monofunctional monomer is 0 to 30% by mass. By having the methacrylic acid alkyl ester content ratio of 70 to 100% by mass, the glass transition temperature of rubber-containing polymer (R2) can be increased, and thus it is preferable from the viewpoint of the handling property of rubber-containing polymer (R2). The content ratio of the methacrylic acid alkyl ester is more preferably 75 to 100% by mass, and even more preferably 80 to 100% by mass, The glass transition temperature of a polymer which is obtained by polymerizing a monomer component containing the methacrylic acid alkyl ester as an essential component is preferably 60° C. or higher. By having the glass transition temperature of 60° C. or higher, an easy handling property of the rubber-containing polymer (R2) to be obtained can be achieved. The glass transition temperature is more preferably 70° C. or higher, and even more preferably 80° C. or higher.

Each of the "monomer component containing acrylic acid alkyl ester and a polyfunctional monomer as an essential component" and "monomer component containing methacrylic acid alkyl ester as an essential component" may be subjected to two or more divided polymerizations, if necessary. When the polymerization is carried out by two or more divided times, type and/or amount of the monomer may be the same or different from each other.

Various additives may be blended in the acrylic resin (H), if necessary. Examples of the various additives include various additives such as anti-oxidants, heat stabilizers, photostabilizers, plasticizers, lubricants, anti-static agents, flame retardants, fillers, mattifying agents, processing auxiliary agents, impact resistance auxiliary agents, antibacterial agents, fungicides, foaming agents, mold lubricants, coloring agents, ultraviolet absorbers and thermoplastic polymers.

From the viewpoint of protecting a base at the time of using the film on a surface layer, in particular, it is preferable to add an ultraviolet absorber to have weather resistance. More preferred examples of the ultraviolet absorber include benzotriazole-based ultraviolet absorbers with a molecular weight of 400 or more and triazine-based ultraviolet absorbers with a molecular weight of 400 or more. Examples of commercialized products of the former include trade name TINUVIN 234 manufactured by BASF SE and trade name Adekastab LA-31 manufactured by ADEKA CORPORATION. Examples of commercialized products of the latter include trade name TINUVIN 1577 manufactured by BASF SE and trade name Adekastab LA-46 manufactured by ADEKA CORPORATION.

Furthermore, it is preferable that a photostabilizer is added to the acrylic resin (H). As the photostabilizer, known materials can be used, but radical scavengers such as hindered amine-based photostabilizers are particularly preferable. Examples of commercialized products of the photostabilizer include Adekastab LA-57 (trade name), Adekastab LA-67 (trade name) and Adekastab LA-77 (trade name) that are manufactured by ADEKA CORPORATION.

[Production of Fluorine-Based Matte Layered Film]

As the method for producing the fluorine-based matte layered film, the following methods (1) to (3) can be mentioned, for example.

(1) A method of coextrusion molding through a feedblock die, a multi-manifold die or the like, in which the method is to form a layered structure of fluorine-based resin layer containing any one of the thermoplastic resin composition (α), (β), (γ), and (δ) and acrylic resin layer of the acrylic resin (H).

(2) A method of respective molding of fluorine-based resin layer containing any one of the thermoplastic resin composition (α), (β), (γ), and (δ) and acrylic resin layer of the acrylic resin (H) to a film state by melt extrusion or the like using a T-die or the like and laminating the two kinds of films by heat lamination.

(3) An extrusion lamination method for forming a film of any one of the thermoplastic resin composition (α), (β), (γ), and (δ) and laminating an acrylic resin layer of the acrylic resin (H) by melt extrusion. Regarding the method (3), any resin of the thermoplastic resin composition (α), (β), (γ), and (δ) can be replaced with the acrylic resin (H).

In particular, from the viewpoint of economic efficiency and process simplification, it is preferable to form a layered structure of fluorine-based resin layer and acrylic resin layer by coextrusion molding. Specifically, the method of coextrusion molding through a feedblock die or a multi-manifold die which is described above is preferable.

Furthermore, as disclosed in JP 2002-361712 A for example, when a layered structure of fluorine-based resin layer and acrylic resin layer is formed by coextrusion molding through a feedblock die, a multi-manifold die or the like, it is also preferable to have a method in which production is carried out by sandwiching it between a mirror surface roll and a rubber roll. When the side of acrylic resin layer constituting the fluorine-based matte layered film is in contact with the mirror surface roll, the surface of the side on which of acrylic resin layer is laminated has a further excellent mirror surface smoothness so that excellent printability can be provided, and therefore desirable.

Furthermore, it is preferable that the side of fluorine-based resin layer is in contact with the rubber roll. In this case, without raising the surface gloss of fluorine-based resin layer (in other words, with keeping the good matte property), the mirror surface smoothness of the side of acrylic resin layer side can be improved, and thus the industrial usefulness is high. The rubber roll is preferably a rubber roll made of silicone from the viewpoint of heat resistance. Known processing methods can be used for the finishing of the surface of the rubber roll made of silicone. However, from the viewpoint of the matching of the surface appearance of fluorine-based matte layered film with the surface appearance of the layered body which is finally obtained by an insert molding or in-mold molding, a rubber roll which is produced by applying and finishing a room temperature curing-type silicone rubber on the outermost surface is preferable.

The fluorine-based resin layer and the acrylic resin layer which constitute the fluorine-based matte layered film may respectively be constituted of a plurality of layers.

Also, in case of having melt extrusion, it is preferable that, to remove a nucleus or a foreign material to cause missing print, the resin composition constituting each layer in a melt state is extruded while it is being filtered through a screen mesh with size of 200 mesh or higher.

The thickness of fluorine-based matte layered film is preferably 500 μm or less. In case of a film used for layered molded article, the thickness is preferably 30 to 400 μm. As the thickness is 30 μm or more, sufficient depth is obtained regarding the appearance of a molded article. Furthermore, in case of molding to a complex shape, sufficient thickness is obtained by elongation. Meanwhile, when the thickness is 400 μm or less, the layered film can have suitable stiffness, and thus the lamination property, secondary processability, or the like are improved. Furthermore, from the viewpoint of mass per unit area, it becomes economically advantageous. Furthermore, the film production can be easily carried out due to a stable film forming property.

EXAMPLES

Hereinbelow, the present invention is explained in view of Examples and Comparative Examples. The examples relating to the first invention are Preparation Examples 1 to 3, Examples 1 to 9, and Comparative Examples 1 to 5. The examples relating to the second invention are Preparation Examples 4 to 10, Examples 11 to 17, and Comparative Example 11. The examples relating to the third invention group are Preparation Examples 11 to 21, Examples 21 to 28, and Comparative Examples 21 to 25. The examples relating to the fourth invention group are Preparation Examples 31 to 32, Example 31, and Comparative Examples 31 to 32.

Furthermore, all of those Examples are also an example relating to the layered film of the sixth invention. From the examples relating to the sixth invention, it is further understood that excellent results are obtained also with the film of the fifth invention.

In the descriptions given below, "parts" represents "part by mass". Also, the evaluations of each film, and layered film were carried out by the following methods. Note that, abbreviations in the following description represent the following.

MMA: methyl methacrylic acid
MA: methyl acrylic acid
nBA: n-butyl acrylic acid
St: styrene
AMA: allyl methacrylic acid
EDMA: ethylene glycol dimethacrylic acid
BDMA: 1,3-butylene glycol dimethacrylic acid
CHP: cumene hydroperoxide
LPO: lauryl peroxide
tBH: t-butyl hydroperoxide
EDTA: disodium ethylenediamine tetraacetate
nOM: n-octyl mercaptan
SLMA: mixture of dodecyl methacrylic acid and tridecyl methacrylic acid
CHMA: cyclohexyl methacrylic acid
nBMA: n-butyl methacrylic acid
iBMA: i-butyl methacrylic acid
HEMA: 2-hydroxyethyl methacrylic acid
nDM: n-dodecyl mercaptan
OTP: 70% solution of sodium dialkylsulfosuccinate (manufactured by Kao Corporation, trade name: "PELEX OT-P")
RS610NA: PHOSPHANOL RS610NA (manufactured by TOHO Chemical Industry Co., Ltd., trade name).

(1) Optical Characteristics of Film (Total Light Transmittance and Haze)

The total light transmittance and haze of a film were measured at the following conditions. The total light transmittance was based on JIS K7361-1 and haze was based on JIS K7136. NDH2000 manufactured by NIPPON DENSHOKU INDUSTRIES Co., LTD was used and the measurement was made after the matte surface of a film is disposed on a light source side.

(2) Evaluation of Appearance During Film Production

According to naked eye observation, the film appearance was evaluated according to the following criteria.
○: matteness is evenly exhibited.
x: matteness is unevenly exhibited or there is an occurrence of melt fracture.

(3) Measurement of 60 Degree Surface Gloss

By using a portable gloss meter (manufactured by KONICA MINOLTA SENSING, INC., trade name: GM-268), 60 degree surface gloss was measured based on JIS Z8741 after overlaying the film (matte surface is on the outside)/black paper card board and installing them such that the film forming width direction is perpendicular to the direction resulting from connecting the light source and the detector of portable gloss meter. There are total 25 measurement points, i.e., 5 points with an equal interval in the film forming width direction and 5 points with an interval of 20 cm in the film forming flow direction. The whole measurement values were averaged to have a measurement value.

(4) Standard Deviation of Gloss

In Examples and Comparative Examples shown in Table 2, standard deviation was calculated for three measurement values that are measured in above (3) for the thermoplastic resin composition (α) which has been prepared with the same formulation.

The fluorine-based resin layer of a layered film (i.e., matte resin layer) was evaluated in terms of each of the following chemical resistances.

(5) Chemical Resistance 1

A gauze was placed on a surface of the fluorine-based resin layer of a layered film (i.e., test specimen) and a drop of suntan lotion (trade name: Coppertone Waterbabies 30 SPF) was placed thereon. Further, an aluminum plate (5 cm×5 cm) and a 500 g load were applied in order thereon and they were left as they were at 74° C. for 1 hour. The test specimen was subsequently washed with neutral detergent and air dried. Then, the surface of the test specimen was observed with a naked eye to evaluate the chemical resistance according to the following criteria.

○: There is no change on the surface of the test specimen.
Δ: There is slight trace due to the solvent on the surface of the test specimen.
x: There is distinct trace due to the solvent or the gauze on the surface of the test specimen, or the surface to which the solvent was contacted is in a white cloudy state.

(6) Chemical Resistance 2

A drop of 10% lactic acid aqueous solution was placed on a surface of the fluorine-based resin layer of a laminated film (i.e., test specimen) and was left as it is at 80° C. for 24 hours. The test specimen was subsequently washed with neutral detergent and air dried. Then, the surface of the test specimen was observed with a naked eye to evaluate the chemical resistance according to the following criteria.

○: There is no change on the surface of the test specimen.
Δ: There is slight trace due to the solvent on the surface of the test specimen.
x: There is distinct trace due to the solvent on the surface of the test specimen, the surface of the film is swollen, or the surface to which the solvent was contacted is in a white cloudy state.

(7) Chemical Resistance 3

A polyethylene cylinder with an inner diameter of 38 mm and a height of 15 mm was placed on a surface of the fluorine-based layer of a laminated film (i.e., test specimen) and was strongly adhered with a test specimen by a compression bonding instrument. To the opening, 5 ml of an aroma freshener for automobile (manufactured by Dia Chemical Co., Ltd., Grace mate poppy citrus type) was injected. After the opening was closed up with a glass plate, it was placed in an incubator whose temperature was kept at 55° C. and was left as it is for 4 hours. After the test, the compression bonding instrument was dismounted. The test specimen was subsequently washed with neutral detergent and air dried. Then, the surface of the test specimen was observed with a naked eye to evaluate the chemical resistance according to the following criteria.

○: There is no change on the surface of the test specimen.
Δ: There is slight trace due to the solvent on the surface of the test specimen.
x: There is distinct trace due to the solvent on the surface of the test specimen, or the surface to which the solvent was contacted is in a white cloudy state.

(8) Chemical Resistance 4

On a surface of the fluorine-based layer of a laminated film (i.e., test specimen), a UV blocking agent manufactured by Johnson & Johnson (trade name: "Neutrogena SPF 45") was applied in an amount of 1.5 g/100 cm². It was then added to an incubator kept at 80° C. and was left as it is for 24 hours. The test specimen was subsequently washed with neutral detergent and air dried. Then, the surface of the test specimen was observed with a naked eye to evaluate the chemical resistance according to the following criteria.

○: There is no change on the surface of the test specimen.
Δ: There is slight trace due to the solvent on the surface of the test specimen.
x: There is distinct trace due to the solvent on the surface of the test specimen, or the surface to which the solvent was contacted is in a white cloudy state.

(9) Chemical Resistance 5

A gauze was placed on a surface of the fluorine-based resin layer of a layered film (i.e., test specimen) and a drop of insect repellent spray (trade name: "OFF! ACTIVE Insect repellent IV", N,N-diethyl-m-toluamide (DEET) content: 25%) was placed thereon. Further, an aluminum plate (5 cm×5 cm) and a 500 g load were applied in order thereon and they were left as they were at 23° C. for 24 hours. The test specimen was subsequently washed with neutral detergent and air dried. Then, the surface of the test specimen was observed with a naked eye to evaluate the chemical resistance according to the following criteria.

○: There is no change on the surface of the test specimen.
Δ: There is slight trace due to the solvent on the surface of the test specimen.
x: There is distinct trace due to the solvent or the gauze on the surface of the test specimen, or the surface to which the solvent was contacted is in a white cloudy state.

(10) Gum Evaluation During Film Production

Pellets of the acrylic resin (H) were plasticized using a 40 mmφ non-bent screw type extruder 1 of which the cylinder temperature was set at 240 to 270° C. Meanwhile, pellets of any one of the thermoplastic resin composition (α), (β), (γ), and (δ) were also plasticized using a 30 mmφ extruder 2 provided with a #200 screen mesh of which the cylinder temperature was set at 230 to 250° C. Then, the discharge amount of the extruder at the acrylic resin (H) side was set at 16.1 kg/h and the discharge amount of the extruder at the thermoplastic resin composition (α), (β), (γ), and (δ) side was set at 1.24 kg/h. Subsequently, a two-layer layered film was discharged through a 400 mm wide multi-manifold die for 2 kinds and 2 layers at 250° C., which has been installed at the tip part of both extruders. When the layered film is produced, 1 hour after adding the plastic resin composition (α), (β), (γ), or (δ) to the extruder 2, presence or absence of gum near the discharge hole of the T die was determined with a naked eye.

○: There was no occurrence of gum near T die discharge hole.
Δ: There was an occurrence of gum of less than 0.5 mm near T die discharge hole.
x: There was an occurrence of gum of 0.5 mm or more near T die discharge hole.

(11) Thickness of Each Layer of Fluorine Resin Layer and Acrylic Resin Layer

The layered film was cut to have thickness of 70 nm in a cross-section direction. The resulting test specimen was observed under a transmission electron microscope (manufactured by JEOL Ltd., trade name: J100S) to measure the respective thicknesses at five positions. The results were then expressed as an average value.

(12) Particle Diameter of Crosslinked Acrylic Matting Agent (F)

Latex of the crosslinked acrylic matting agent (F) was diluted with de-ionized water, and by using a laser diffraction/scattering type particle diameter distribution analyzer (manufactured by Shimadzu Corporation, "SALD-7100"), the median diameter converted in terms of the volume average was measured for the crosslinked acrylic matting agent (F), and the resulting median diameter was used as particle diameter. Concentration of the latex provided for the measurement was suitably adjusted so as to be within an appropriate range for the scattered light intensity monitor which is attached to the device. Furthermore, as a material having standard particle diameter, 12 samples of known monodispersed polystyrene of which particle diameter is in the range of from 20 to 800 nm were used.

[Preparation Example 1] Preparation of the Matting Agent (B)

To a reaction vessel equipped with a stirrer, a reflux condenser, and an inlet for introducing nitrogen gas, the monomer mixture (1) consisting of the following 7 components was injected.
Monomer Mixture (1):
MA: 10 parts
MMA: 60 parts
HEMA: 30 parts
nOM: 0.18 part
LPO: 1 part
Calcium triphosphate: 1.8 parts
Deionized water: 250 parts.

Subsequently, after the atmosphere inside the reaction vessel was sufficiently replaced with nitrogen gas, the monomer mixture (1) in the reaction vessel was heated up to 75° C. with stirring it to carry out the reaction under nitrogen atmosphere for 3 hours. After that, the liquid temperature in the reaction vessel was raised up to 90° C., and the liquid temperature of 90° C. was further maintained for 45 minutes to obtain polymer beads. Then, a sieving operation of the beads of the obtained polymer was carried out under a condition of 150 meshes (aperture size of 100 μm). The beads which have passed through the mesh were dehydrated and dried to obtain the beads of the matting agent (B), which is a thermoplastic resin. Glass transition temperature of the matting agent (B) was 77° C., intrinsic viscosity was 0.11 L/g, Mw/Mn was 2.1, and volume average particle diameter was 70 μm.

[Preparation Example 2] Preparation of the Rubber-Containing Polymer (R2-1)

10.8 Parts of deionized water were injected to a vessel having a stirrer. After that, monomer mixture (m1) consisting of 0.3 part of MMA, 4.5 parts of nBA, 0.2 part of BDMA, 0.05 part of AMA, and 0.025 part of CHP was added to the vessel and stirred and mixed at room temperature. Then, 1.3 parts of the emulsifier RS610NA were supplied to the above-mentioned vessel with stirring, and the stirring was continued for 20 minutes to prepare an emulsion.

Next, 186.5 parts of deionized water was supplied to a polymerization reaction vessel having a condenser, and the liquid temperature was raised up to 70° C. Further, a liquid mixture consisting of 5 parts of deionized water, 0.20 part of sodium formaldehyde sulfoxylate, 0.0001 part of ferrous sulfate, and 0.0003 part of EDTA was supplied all at once to the polymerization reaction vessel. Then, the emulsion prepared was added dropwise to the polymerization reaction vessel over 8 minutes with stirring the polymerization reaction vessel under nitrogen atmosphere, and the reaction was continued for 15 minutes to obtain a rubber polymer consisting of the monomer mixture (m1).

Subsequently, the monomer mixture (m2) consisting of 9.6 parts of MMA, 14.4 parts of nBA, 1.0 part of BDMA, 0.25 part of AMA, and 0.016 part of CHP was added dropwise to the polymerization vessel over 90 minutes. The reaction was then allowed to occur for 60 minutes to obtain a rubber polymer (R1) consisting of the monomer mixture (m1) and the monomer mixture (m2).

Subsequently, the monomer mixture (m3) consisting of 6 parts of MMA, 4 parts of MA, 0.075 part of AMA, and 0.0125 part of CHP was added dropwise to the polymerization vessel over 45 minutes. The reaction was then allowed to occur for 60 minutes to obtain a polymer.

Subsequently, the monomer mixture (m4) consisting of 57 parts of MMA, 3 parts of MA, 0.264 part of nOM, and 0.075 part of tBH was added dropwise to the polymerization vessel over 140 minutes. The reaction was then allowed to occur for 60 minutes to obtain latex of rubber-containing polymer.

The obtained latex was filtered using a vibration type filtering apparatus to which a mesh made of SUS (average aperture size: 62 μm) was attached. After that, it was salted out in an aqueous solution including 3.5 parts of calcium acetate. It was washed with water, collected and dried to obtain powdery the rubber-containing polymer (R2-1) of Preparation Example 2. Composition of the rubber-containing polymer (R2-1) is summarized in Table 1.

[Preparation Example 3] Preparation of the Rubber-Containing Polymer (R2-2)

Under nitrogen atmosphere, 204 parts of deionized water was supplied to a reaction vessel equipped with a stirrer and a reflux condenser, and the liquid temperature was raised up to 80° C. Then, 0.25 part of sodium formaldehyde sulfoxylate, 0.0001 part of ferrous sulfate, and 0.0003 part of EDTA were added thereto. Then, while stirring the liquid inside the reaction vessel, 1/10 of the monomer mixture (m1) consisting of 11.2 parts of MMA, 12.4 parts of nBA, 1.2 parts of St, 0.1 part of AMA, 0.7 part of BDMA, 0.04 part of tBH, and 0.7 part of RS610NA was added, and the reaction was allowed to occur for 15 minutes. Furthermore, after adding continuously the remaining monomer mixture (m1) such that the increase rate of the monomer mixture relative to water is 8%/hour, the reaction was allowed to occur for 1 hour to obtain a rubber polymer.

Subsequently, to latex of the obtained rubber polymer, 0.12 part of sodium formaldehyde sulfoxylate was added and maintained for 15 minutes. Then, under stirring at 80° C. with nitrogen atmosphere, the monomer mixture (m2) consisting of 30.7 parts of nBA, 6.5 parts of St, 0.65 part of AMA, 0.1 part of BDMA, 0.11 part of CHP, and 0.59 part of RS610NA was continuously added such that the increase rate of the monomer mixture relative to water is 4%/hour, and the reaction was allowed to occur for 120 minutes to obtain latex of the rubber-containing polymer (R1).

Subsequently, to latex of the rubber polymer (R1), 0.12 part of sodium formaldehyde sulfoxylate was added and maintained for 15 minutes. Then, under stirring at 80° C. with nitrogen atmosphere, the monomer mixture (m4) consisting of 35.3 parts of MMA, 1.9 parts of MA, 0.11 part of nOM, and 0.06 part of tBH was continuously added such that the increase rate of the monomer mixture relative to water is 10%/hour, and the reaction was allowed to occur for 1 hour to obtain latex of the rubber-containing polymer.

The obtained latex was filtered using a vibration type filtering apparatus to which a mesh made of SUS (average aperture size: 150 µm) was attached. After that, it was salted out in an aqueous solution including 3 parts of calcium acetate in 306 parts of deionized water. It was washed with water, collected and dried to obtain powdery the rubber-containing polymer (R2-2) of Preparation Example 3. Composition of the rubber-containing polymer (R2-2) is summarized in Table 1.

Examples 1-1 to 1-3

1. Preparation of the Thermoplastic Resin Composition (α)

4.8 parts of the matting agent (B) of Preparation Example 1, 42.2 parts of "ACRYPET VH #001" (trade name) as the thermoplastic resin (C), which is an acrylic resin manufactured by Mitsubishi Rayon Co., Ltd., and 0.1 part of "ADEKASTAB AO-60" (trade name) as an anti-oxidant, which is a phenol-based anti-oxidant manufactured by ADEKA CORPORATION were blended relative to 100 parts of polyvinylidene fluoride as the fluorine-based resin (A) (manufactured by KUREHA CORPORATION, trade name: KF T850). The blended mixture was mixed for 30 seconds by using a Henschel mixer. The obtained mixture was supplied to the inside of a twin screw extruder (manufactured by TOSHIBA MACHINE CO., LTD., trade name: TEM35) and extruded as a melt strand from the nozzle at conditions including cylinder temperature of 140 to 240° C. and die head temperature of 240° C. while foreign materials are removed using a #300 screen mesh. Then, pellets of the thermoplastic resin composition (α) were obtained by cutting.

2. Preparation of the Acrylic Resin (H)

80 parts of the rubber-containing polymer (R2-1), 10 parts of the rubber-containing polymer (R2-2), 10 parts of the thermoplastic polymer (C-1), 1.4 parts of a benzotriazole-based UV absorber "TINUVIN 234" (trade name) manufactured by BASF SE, 0.3 part of a hindered amine-based photostabilizer "ADEKASTAB LA-57" (trade name) manufactured by ADEKA CORPORATION, and 0.1 part of a hindered phenol-based photostabilizer "IRGANOX 1076" (trade name) manufactured by BASF SE were blended with one another. The blended mixture was mixed for 30 seconds by using a Henschel mixer. The obtained mixture was supplied to the inside of a twin screw extruder (manufactured by TOSHIBA MACHINE CO., LTD., trade name: TEM35) and extruded as a melt strand from the nozzle at conditions including cylinder temperature of 140 to 240° C. and die head temperature of 240° C. while foreign materials are removed using a #300 screen mesh. Then, pellets of the acrylic resin (H) were obtained by cutting.

Meanwhile, the thermoplastic polymer (C-1) is a MMA-MA copolymer (MMA/MA=90/10 (mass ratio), and it has reduction viscosity: 0.060 L/g, number average molecular weight: 42,000, mass average molecular weight: 92,000, molecular weight distribution (mass average molecular weight/number average molecular weight): 2.2, and temperature of deflection under load at 1.8 MPa as measured based on JIS K7191: 89° C.

3. Production and Evaluation of Layered Film

The pellets of the thermoplastic resin composition (α) and the pellets of the acrylic resin (H) were dried at 80° C. all day and night. After the drying, the pellets of the acrylic resin (H) were plasticized by adding them to a 40 mmφ non-bent screw type extruder 1 provided with a #200 screen mesh of which the cylinder temperature was set at 240 to 270° C. Meanwhile, pellets of the thermoplastic resin composition (α) were also plasticized by adding them to a 30 mmφ extruder 2 provided with a #200 screen mesh of which the cylinder temperature was set at 230 to 250° C. Then, the discharge amount of the extruder 1 was set at 16.1 kg/h and the discharge amount of the extruder 2 was set at 1.24 kg/h. Subsequently, a two-layer film was discharged through a 400 mm wide multi-manifold die for 2 kinds and 2 layers at 250° C., which has been installed at the tip part of both extruders. Subsequently, the film was conveyed such that the acrylic resin (H) layer side of the above two-layer film is in contact in order with the first mirror surface cooling roller at temperature of 80° C. and the second mirror surface cooling roller at temperature of 75° C. Accordingly, a fluorine-based matte layered film with a two-layer structure was obtained. Thickness of the film was 125 µm, thickness of the thermoplastic resin composition (α) layer was 9 µm, and thickness of the acrylic resin (H) layer was 116 µm.

By repeating the processes until the above 3 times at the same conditions, a layered film of Examples (1-1) to (1-3) was obtained. Then, evaluation of total light transmittance, haze, appearance, 60 degree surface gloss, standard deviation of gloss, and gum was carried out for the obtained fluorine-based matte layered film. The results are summarized in Table 2.

Examples 2-1 to 2-3

1. Preparation of Master Batch Pellets 35 parts of the matting agent (B) of Preparation Example 1, 65 parts of "ACRYPET VH #001" (trade name) as the thermoplastic resin (C), which is an acrylic resin manufactured by Mitsubishi Rayon Co., LTD., and 0.59 part of "ADEKASTAB AO-60" (trade name), which is a phenol-based anti-oxidant manufactured by ADEKA CORPORATION, were blended with one another. The blended mixture was mixed for 30 seconds by using a Henschel mixer. The obtained mixture was supplied to the inside of a twin screw extruder (manufactured by TOSHIBA MACHINE CO., LTD., trade name: TEM35) and extruded as a melt strand from the nozzle at conditions including cylinder temperature of 140 to 240° C. and die head temperature of 240° C. while foreign materials are removed using a #300 screen mesh. Then, master batch pellets were obtained by cutting.

2. Preparation of the Thermoplastic Resin Composition (α)

Subsequently, 17.1 parts of the master batch pellets and 29.7 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). The blended mixture was mixed for 30 seconds by using a Henschel mixer. The obtained mixture was supplied to the inside of a twin screw extruder (manufactured by TOSHIBA MACHINE CO LTD., trade name: TEM35) and extruded as a melt strand from the nozzle at conditions including cylinder temperature of 140 to 240° C. and die head temperature of 240° C. while foreign materials are removed using a #300 screen mesh. Then, pellets of the thermoplastic resin composition (α) were obtained by cutting.

3. Production and Evaluation of Layered Film

After the step for preparing the acrylic resin (H), the fluorine-based matte layered film was obtained and evaluated according to the same method as Examples 1-1 to 1-3. The evaluation results are summarized in Table 2 and Table 3.

Examples 3-1 to 3-3

Master batch pellets were prepared in the same manner as Examples 2-1 to 2-3. Furthermore, 20 parts of the master batch pellets and 26.9 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1. Other than that, the fluorine-based matte layered film was respectively obtained and evaluated according to the same method as Examples 2-1 to 2-3. The evaluation results are summarized in Table 2 and Table 3.

Examples 4-1 to 4-3

Master batch pellets were prepared in the same manner as Examples 2-1 to 2-3. Furthermore, 22.9 parts of the master batch pellets and 24 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1 to 2-3. Other than that, the fluorine-based matte layered film was respectively obtained and evaluated according to the same method as Examples 2-1 to 2-3. The evaluation results are summarized in Table 2 and Table 3.

Examples 5-1 to 5-3

Master batch pellets were prepared in the same manner as Examples 2-1 to 2-3. Furthermore, 37.1 parts of the master batch pellets and 9.9 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1 to 2-3. Other than that, the fluorine-based matte layered film was respectively obtained and evaluated according to the same method as Examples 2-1 to 2-3. The evaluation results are summarized in Table 2.

Examples 6-1 to 6-3

Master batch pellets were prepared in the same manner as Examples 2-1 to 2-3. Furthermore, 22.8 parts of the master batch pellets and 15.2 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1 to Example 2-3. Other than that, the fluorine-based matte layered film was respectively obtained and evaluated according to the same method as Examples 2-1 to 2-3. The evaluation results are summarized in Table 2.

Examples 7-1 to 7-3

Master batch pellets were prepared in the same manner as Examples 2-1 to 2-3. Furthermore, 22.8 parts of the master batch pellets and 10.2 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1. Other than that, the fluorine-based matte layered film was respectively obtained and evaluated according to the same method as Examples 2-1 to 2-3. The evaluation results are summarized in Table 2.

Example 8

Master batch pellets were prepared in the same manner as Examples 2-1. Furthermore, 10 parts of the master batch pellets and 37 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1. Other than that, the fluorine-based matte layered film was obtained and evaluated according to the same method as Example 2-1. The evaluation results are summarized in Table 2.

Example 9

Master batch pellets were prepared in the same manner as Examples 2-1. Furthermore, 34.2 parts of the master batch pellets and 12.8 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Example 2-1. Other than that, the fluorine-based matte layered film was obtained and evaluated according to the same method as Example 2-1. The evaluation results are summarized in Table 2.

Comparative Examples 1-1 to 1-3

Master batch pellets were prepared in the same manner as Examples 2-1 to 2-3. Furthermore, 22.8 parts of the master batch pellets and 24.2 parts of "ACRYPET VH #001" (trade name) as the thermoplastic resin (C), which is an acrylic resin manufactured by Mitsubishi Rayon Co., Ltd., were blended relative to 100 parts of polyvinylidene fluoride as the fluorine-based resin (A) (manufactured by KUREHA CORPORATION, trade name: KF T850). Then, pellets of the thermoplastic resin composition ($\alpha$) were prepared in the same manner as Examples 2-1 to 2-3. Other than that, the fluorine-based matte layered film was respectively obtained and evaluated according to the same method as Examples 2-1 to 2-3. The evaluation results are summarized in Table 2.

Comparative Examples 2-1 to 2-3

6 Parts of the matting agent (B) of Preparation Example 1 and 0.1 part of "ADEKASTAB AO-60" (trade name) as an anti-oxidant, which is a phenol-based anti-oxidant manufactured by ADEKA CORPORATION, were blended relative to 100 parts of polyvinylidene fluoride as the fluorine-based resin (A) (manufactured by KUREHA CORPORATION, trade name: KF T850). Other than that, the fluorine-based matte layered film was obtained and evaluated according to the same method as Examples 1-1 to 1-3. The evaluation results are summarized in Table 2 and Table 3.

Comparative Example 3

47 Parts of "ACRYPET VH #001" (trade name) as the thermoplastic resin (C), which is an acrylic resin manufactured by Mitsubishi Rayon Co., Ltd., and 0.1 part of "ADEKASTAB AO-60" (trade name) as an anti-oxidant, which is a phenol-based anti-oxidant manufactured by ADEKA CORPORATION were blended relative to 100 parts of polyvinylidene fluoride as the fluorine-based resin (A) (manufactured by KUREHA CORPORATION, trade name: KF T850). Other than that, the fluorine-based matte layered film was obtained and evaluated according to the same method as Example 1-1. The evaluation results are summarized in Table 2.

Comparative Example 4

8 Parts of the matting agent (B) of Preparation Example 1, 78 parts of "ACRYPET VH #001" (trade name) as the thermoplastic resin (C), which is an acrylic resin manufactured by Mitsubishi Rayon Co., Ltd., and 0.1 part of "ADEKASTAB AO-60" (trade name) as an anti-oxidant, which is a phenol-based anti-oxidant manufactured by ADEKA CORPORATION were blended relative to 100 parts of polyvinylidene fluoride as the fluorine-based resin (A) (manufactured by KUREHA CORPORATION, trade name: KF T850). Other than that, the fluorine-based matte layered film was obtained and evaluated according to the same method as Example 1-1. The evaluation results are summarized in Table 2 and Table 3.

Comparative Example 5

5 Parts of EPOSTAR MA1004 (trade name) as particles of crosslinked polymethyl methacrylic acid manufactured by Nippon Shokubai Co., Ltd., 78 parts of "ACRYPET VH #001" (trade name) as the thermoplastic resin (C), which is an acrylic resin manufactured by Mitsubishi Rayon Co., Ltd., and 0.1 part of "ADEKASTAB AO-60" (trade name) as an anti-oxidant, which is a phenol-based anti-oxidant manufactured by ADEKA CORPORATION were blended relative to 100 parts of polyvinylidene fluoride as the fluorine-based resin (A) (manufactured by KUREHA CORPORATION, trade name: KF T850). Other than that, the fluorine-based matte layered film was obtained and evaluated according to the same method as Example 1-1. The evaluation results are summarized in Table 2.

TABLE 1

| Polymer | Monomer component | Raw material | Preparation Example 2 R2-1 | Preparation Example 3 R2-2 |
|---|---|---|---|---|
| Rubber-containing polymer (R2) | Rubber polymer (R1) | m1 | MMA | 0.3 | 11.2 |
| | | | nBA | 4.5 | 12.4 |
| | | | St | — | 1.2 |
| | | | AMA | 0.05 | 0.1 |
| | | | BDMA | 0.2 | 0.7 |
| | | | tBH | — | 0.04 |
| | | | RS610NA | 1.3 | 0.7 |
| | | | CHP | 0.025 | — |
| | | m2 | MMA | 9.6 | — |
| | | | nBA | 14.4 | 30.7 |
| | | | St | — | 6.5 |
| | | | AMA | 0.25 | 0.65 |
| | | | BDMA | 1.0 | 0.1 |
| | | | CHP | 0.016 | 0.11 |
| | | | RS610NA | — | 0.59 |
| | | m3 | MMA | 6.0 | — |
| | | | MA | 4.0 | — |
| | | | AMA | 0.075 | — |
| | | | CHP | 0.0125 | — |
| | | m4 | MMA | 57.0 | 35.3 |
| | | | MA | 3.0 | 1.9 |
| | | | nOM | 0.264 | 0.11 |
| | | | tBH | 0.075 | 0.06 |

Unit [parts]

TABLE 2

| | Thermoplastic resin composition (α) [parts] | | | | | Evaluation of fluorine-based matte layered film | | | | | |
|---|---|---|---|---|---|---|---|---|---|---|---|
| | Fluorine-based resin (A) | Thermoplastic resin matting agent (B) | EPOSTAR MA1004 | Thermoplastic resin (C) | Additive AO-60 | Total light transmittance [%] | Haze [%] | Appearance | 60 Degree gloss [%] | Standard deviation of gloss | Productivity evaluation Gum evaluation |
| Example 1-1 | 100 | 4.8 | 0 | 42.2 | 0.1 | 91.3 | 27.7 | ○ | 41.1 | 0.9 | ○ |
| Example 1-2 | | | | | | 91.4 | 26.6 | ○ | 39 | | ○ |
| Example 1-3 | | | | | | 91.5 | 24.9 | ○ | 40.6 | | ○ |
| Example 2-1 | 100 | 6 | 0 | 39 | 0.1 | 91.4 | 40.3 | ○ | 22.9 | 1.6 | ○ |
| Example 2-2 | | | | | | 91.3 | 35.1 | ○ | 26.3 | | ○ |
| Example 2-3 | | | | | | 91.4 | 37.9 | ○ | 22.9 | | ○ |
| Example 3-1 | 100 | 7 | 0 | 40 | 0.1 | 92.2 | 52.6 | ○ | 17.7 | 0.3 | ○ |
| Example 3-2 | | | | | | 92.0 | 50.4 | ○ | 18.1 | | ○ |
| Example 3-3 | | | | | | 92.0 | 49.6 | ○ | 17.3 | | ○ |
| Example 4-1 | 100 | 8 | 0 | 39 | 0.1 | 91.8 | 42.7 | ○ | 20.2 | 0.4 | ○ |
| Example 4-2 | | | | | | 91.8 | 42.9 | ○ | 20.1 | | ○ |
| Example 4-3 | | | | | | 91.8 | 50.0 | ○ | 19.3 | | ○ |
| Example 5-1 | 100 | 13 | 0 | 34 | 0.2 | 93.3 | 64.8 | ○ | 12.9 | 0.2 | ○ |
| Example 5-2 | | | | | | 93.5 | 65.2 | ○ | 13.3 | | ○ |
| Example 5-3 | | | | | | 92.7 | 57.7 | ○ | 12.3 | | ○ |

TABLE 2-continued

| | Thermoplastic resin composition (α) [parts] | | | | | Evaluation of fluorine-based matte layered film | | | | | |
|---|---|---|---|---|---|---|---|---|---|---|---|
| | Fluorine-based resin (A) | Thermoplastic resin matting agent (B) | EPOSTAR MA1004 | Thermoplastic resin (C) | Additive AO-60 | Total light transmittance [%] | Haze [%] | Appearance | 60 Degree gloss [%] | Standard deviation of gloss | Productivity evaluation Gum evaluation |
| Example 6-1 | 100 | 8 | 0 | 30 | 0.1 | 91.6 | 40.3 | ○ | 23.8 | 0.8 | ○ |
| Example 6-2 | | | | | | 92.0 | 42.9 | ○ | 23 | | ○ |
| Example 6-3 | | | | | | 91.7 | 42.5 | ○ | 21.9 | | ○ |
| Example 7-1 | 100 | 8 | 0 | 25 | 0.1 | 92.6 | 39.8 | ○ | 23.2 | 5.9 | ○ |
| Example 7-2 | | | | | | 92.8 | 35.4 | ○ | 30.6 | | ○ |
| Example 7-3 | | | | | | 92.8 | 58.1 | ○ | 16.1 | | ○ |
| Comparative Example 1-1 | 100 | 8 | 0 | 15 | 0.1 | 92.2 | 50.8 | ○ | 13.8 | 6.4 | ○ |
| Comparative Example 1-2 | | | | | | 92.1 | 34.0 | ○ | 28.6 | | ○ |
| Comparative Example 1-3 | | | | | | 92.0 | 36.4 | ○ | 25.4 | | ○ |
| Comparative Example 2-1 | 100 | 6 | 0 | 0 | 0.1 | 93.5 | 36.0 | ○ | 26 | 7.0 | Δ |
| Comparative Example 2-2 | | | | | | 93.2 | 43.3 | ○ | 37.5 | | Δ |
| Comparative Example 2-3 | | | | | | 92.4 | 43.5 | ○ | 20.7 | | Δ |
| Example 8 | 100 | 3.5 | 0 | 44 | 0.1 | 92.6 | 11.9 | ○ | 87.5 | — | ○ |
| Example 9 | 100 | 12 | 0 | 35 | 0.2 | 94.0 | 68.1 | ○ | 11.7 | — | ○ |
| Comparative Example 3 | 100 | 0 | 0 | 47 | 0.1 | 93.0 | 0.6 | x | 137 | — | ○ |
| Comparative Example 4 | 100 | 8 | 0 | 78 | 0.1 | 90.6 | 33.4 | ○ | 31.8 | — | ○ |
| Comparative Example 5 | 100 | 0 | 3.8 | 33.3 | 0.1 | 93.2 | 41.2 | ○ | 35 | — | x |

TABLE 3

| | Thermoplastic resin composition (α) [parts] | | | | Evaluation of layered film | | | | |
|---|---|---|---|---|---|---|---|---|---|
| | Fluorine-based resin (A) | Thermoplastic resin matting agent (B) | Thermoplastic resin (C) | Additive AO-60 | Chemical resistance 1 | Chemical resistance 2 | Chemical resistance 3 | Chemical resistance 4 | Chemical resistance 5 |
| Example 2-2 | 100 | 6 | 39 | 0.1 | ○ | Δ | ○ | ○ | Δ |
| Example 3-2 | 100 | 7 | 40 | 0.1 | ○ | Δ | ○ | ○ | Δ |
| Example 4-2 | 100 | 8 | 39 | 0.1 | ○ | Δ | ○ | ○ | Δ |
| Comparative Example 2-2 | 100 | 6 | 0 | 0.1 | ○ | Δ | ○ | ○ | Δ |
| Comparative Example 4 | 100 | 8 | 78 | 0.1 | Δ | Δ | x | ○ | x |

[Preparation Example 4] Preparation of the Acrylic Matting Agent (D-1)

195 Parts of deionized water was supplied to a polymerization reaction vessel equipped with a stirrer, a condenser, a thermocouple, and an inlet for introducing nitrogen gas. Subsequently, with stirring under nitrogen, the monomer component (m11) consisting of 5.0 parts of monofunctional monomer (0.3 part of MMA and 4.7 parts of nBA), 0.0275 part of AMA as polyfunctional monomer, 0.025 part of tBH, and 1.0 part of OTP was added all at once to the polymerization reaction vessel. After adding the monomer component (m11), temperature of the liquid inside the reaction vessel was raised to 75° C. over 30 minutes. After completion of the temperature increase, 5 parts of deionized water 0.20 part of sodium formaldehyde sulfoxylate, 0.0001 part of ferrous sulfate, and 0.0003 part of EDTA were supplied all at once to the reaction vessel. From the moment at which the peak temperature resulting from exothermic reaction is observed, temperature of the liquid inside the reaction vessel was maintained at 75° C. for 15 minutes to continue the reaction. Accordingly, the polymer (P11) was obtained.

Subsequently, the monomer component (m12) consisting of 50.0 parts of monofunctional monomer (0.3 part of MMA and 47.0 parts of nBA), 0.275 part of AMA as polyfunctional monomer, and 0.25 part of tBH was added dropwise to the polymerization reaction vessel over 120 minutes. After completion of the dropwise addition, temperature of the liquid inside the reaction vessel was maintained at 75° C. for 60 minutes to continue the reaction. Accordingly, the polymer (P12) was obtained, and thus the acrylic acid alkyl ester polymer (P13) consisting of the polymer (P11) and the polymer (P12) was obtained.

Furthermore, in the presence of the acrylic acid alkyl ester polymer (P13), the monomer component (m14) consisting of 40.5 parts of MMA, 4.5 parts of nBA, 0.062 part of tBH, and 0.3 part of nOM was added dropwise to the polymerization reaction vessel over 120 minutes. After completion of the dropwise addition, temperature of the liquid inside the reaction vessel was maintained at 75° C. for 60 minutes to continue the reaction. Accordingly, the polymer (P14) was obtained, and thus the acrylic matting agent (D) in latex state was obtained.

[Preparation Examples 5 to 10] Preparation of the Acrylic Matting Agents (D-2) to (D-7)

The acrylic matting agents (D-2) to (D-7) were prepared in the same manner as Preparation Example 4 except that the monomer component is modified to those described in Table 4. The raw material composition of the acrylic matting agent (D) is summarized in Table 4.

3. Production and Evaluation of Layered Film

A fluorine-based matte layered film with two-layer structure was obtained in the same manner as Example 1 except that pellets of the thermoplastic resin composition (β) are used instead of pellets of the thermoplastic resin composition (α). Thickness of the thermoplastic resin composition (β) layer was 7 μm and thickness of the acrylic resin (H) layer was 120 μm. The layered film was evaluated in the same manner as Example 1 and the evaluation results are summarized in Table 5.

TABLE 4

| Polymer | | Monomer | Raw material | Preparation Example 4 D-1 | Preparation Example 5 D-2 | Preparation Example 6 D-3 | Preparation Example 7 D-4 | Preparation Example 8 D-5 | Preparation Example 9 D-6 | Preparation Example 10 D-7 |
|---|---|---|---|---|---|---|---|---|---|---|
| Acrylic matting agent (D) | Acrylic acid alkyl ester polymer (P13) | P11 m13 m11 | MMA | 0.3 | 0.3 | 0.3 | 0.3 | 0.3 | 0.3 | 0.3 |
| | | | nBA | 4.7 | 4.7 | 4.7 | 4.7 | 4.7 | 4.7 | 4.7 |
| | | | AMA | 0.0275 | 0.0138 | 0.0275 | 0.0138 | 0.0138 | — | 0.0275 |
| | | | tBH | 0.025 | 0.025 | 0.025 | 0.025 | 0.025 | 0.025 | 0.025 |
| | | | OTP | 1 | 1 | 1 | 1 | 1 | 1 | 1 |
| | | P12 m12 | MMA | 3 | 3 | 3.9 | 3.9 | 3.9 | 3.9 | 4.5 |
| | | | nBA | 47 | 47 | 61.1 | 61.1 | 61.1 | 61.1 | 70.5 |
| | | | AMA | 0.275 | 0.138 | 0.358 | 0.179 | 0.179 | — | 0.4125 |
| | | | tBH | 0.25 | 0.25 | 0.33 | 0.33 | 0.33 | 0.33 | 0.375 |
| | Polymer (P14) | — m14 | MMA | 40.5 | 40.5 | 29.7 | 29.7 | 29.7 | 29.7 | 19.8 |
| | | | nBA | 4.5 | 4.5 | 0.3 | 0.3 | 0.3 | 0.3 | 0.2 |
| | | | tBH | 0.062 | 0.062 | 0.041 | 0.041 | 0.041 | 0.041 | 0.028 |
| | | | nOM | 0.3 | 0.3 | 0.2 | 0.2 | 0.2 | 0.2 | 0.13 |
| Content of acrylic acid alkyl ester in monofunctional monomer | | | | 56.2 | 56.2 | 66.1 | 66.1 | 66.1 | 66.1 | 75.4 |
| Content other than acrylic acid alkyl ester in monofunctional monomer | | | | 43.8 | 43.8 | 33.9 | 33.9 | 33.9 | 33.9 | 24.6 |

Unit [parts]

Example 11

1. Preparation of the Thermoplastic Resin Composition (β)

90 Parts of polyvinylidene fluoride (manufactured by Arkema, trade name: KYNAR720) as the fluorine-based resin (A), 10 parts of the matting agent (D) of Preparation Example 4, and 0.1 part of a hindered phenol-based antioxidant "IRGANOX 1076" (trade name) manufactured by BASF SE were blended with one another. The blended mixture was mixed for 30 seconds by using a Henschel mixer. The obtained mixture was supplied to the inside of a twin screw extruder (manufactured by TOSHIBA MACHINE CO., LTD., trade name: TEM35) and extruded as a melt strand from the nozzle at conditions including cylinder temperature of 180 to 200° C. and die head temperature of 220° C. while foreign materials are removed using a #300 screen mesh. Then, pellets of the thermoplastic resin composition (β) were obtained by cutting.

2. Preparation of the Acrylic Resin (H)

Pellets of the acrylic resin (H) were obtained in the same manner as Example 1.

Examples 12 to 17

A fluorine-based matte layered film with two-layer structure was obtained in the same manner as Example 11 except that the acrylic matting agent (D) is modified to the one shown in Table 5 and thickness of the acrylic resin layer is modified to 140 μm. The evaluation results are summarized in Table 5.

Comparative Example 11

A fluorine-based matte layered film with two-layer structure was obtained in the same manner as Example 11 except that the matting agent (B) as a thermoplastic resin of Preparation Example 1 is used instead of the acrylic matting agent (D) and the fluorine-based resin (A) is set at 94 parts and the matting agent (B) as a thermoplastic resin of Preparation Example 1 is set at 6 parts. The evaluation results are summarized in Table 5.

TABLE 5

| | | | Example 11 | Example 12 | Example 13 | Example 14 | Example 15 | Example 16 | Example 17 | Comparative Example 11 |
|---|---|---|---|---|---|---|---|---|---|---|
| Thermoplastic resin composition (β) [parts] | Fluorine-based resin (A) | Vinylidene fluoride Kynar720 | 90 | 90 | 90 | 90 | 90 | 90 | 90 | 94 |
| | Acrylic matting agent (D) | D-1 | 10 | — | — | — | — | — | — | — |
| | | D-2 | — | 10 | — | — | — | — | — | — |
| | | D-3 | — | — | 10 | — | — | — | — | — |

TABLE 5-continued

|  |  | Example 11 | Example 12 | Example 13 | Example 14 | Example 15 | Example 16 | Example 17 | Comparative Example 11 |
|---|---|---|---|---|---|---|---|---|---|
|  | D-4 | — | — | — | 10 | — | — | — | — |
|  | D-5 | — | — | — | — | 10 | — | — | — |
|  | D-6 | — | — | — | — | — | 10 | — | — |
|  | D-7 | — | — | — | — | — | — | 10 | — |
| Thermoplastic resin matting agent (B) | Preparation Example 1 | — | — | — | — | — | — | — | 6 |
| Anti-oxidant | IRGANOX 1076 | 0.1 | 0.1 | 0.1 | 0.1 | 0.1 | 0.1 | 0.1 | 0.1 |
| Thickness of the matte resin layer [μm] | | 7 | 7 | 7 | 7 | 7 | 7 | 7 | 7 |
| Thickness of the acrylic resin layer [μm] | | 120 | 140 | 140 | 140 | 140 | 140 | 140 | 120 |
|  | Gum evaluation | ○ | ○ | ○ | ○ | ○ | ○ | ○ | Δ |
| Optical characteristics | Total light transmittance [%] | 92.8 | 90.9 | 91.6 | 91.9 | 91.0 | 90.7 | 92.3 | 92.4 |
|  | Haze [%] | 15.1 | 21.9 | 24.4 | 24.7 | 28.5 | 20.5 | 28.6 | 35.7 |
|  | 60 Degree surface gloss | 68 | 34 | 34 | 39 | 30 | 48 | 35 | 28 |
| Chemical resistance | Suntan | ○ | ○ | ○ | ○ | ○ | Δ | ○ | ○ |
|  | Lactic acid | ○ | ○ | ○ | ○ | ○ | ○ | ○ | ○ |
|  | POPPY | ○ | ○ | ○ | ○ | ○ | ○ | ○ | ○ |
|  | Neutrogena | ○ | ○ | ○ | ○ | ○ | ○ | ○ | ○ |
|  | DEET | ○ | Δ | Δ | Δ | Δ | Δ | x | Δ |

[Preparation Example 11] Preparation of the Acrylic Matting Agent (E-1)

235 Parts of deionized water, 0.3 part of sodium sulfate, and 0.02 part of a copolymer of ethyl methacrylic acid sulfonate were supplied to a polymerization reaction vessel equipped with a stirrer, a condenser, a thermocouple, and an inlet for introducing nitrogen gas. Subsequently, atmosphere inside the polymerization reaction vessel was replaced with nitrogen. With stirring of the inside of the polymerization vessel under nitrogen atmosphere, the monomer component consisting of 35 parts of SLMA as the acrylic monomer (b6), which is a mixture of dodecyl methacrylic acid of which linear alkyl group has carbon atom number of 12 and tridecyl methacrylic acid of which linear alkyl group has carbon atom number of 13, 58 parts of MMA and 7 parts of MA as the other monofunctional monomer (b7) and 0.40 part of LPO as a polymerization initiator were added, and then heated such that the liquid temperature after the addition is 75° C. followed by further polymerization. After confirming an exothermic peak, the liquid temperature was raised to 90° C., and maintained at the same temperature for 60 minutes to complete the polymerization. The obtained polymer beads were sifted through a 150 mesh filter (aperture size of 100 μm) followed by dehydration and drying to obtain the acrylic matting agent (E-1).

Tg of the acrylic matting agent (E-1), amount of acetone insolubles, Mn, Mw, and Mw/Mn acetone solubles were either calculated or measured, and described in Table 6.

[Preparation Examples 12 to 21] Preparation of the Acrylic Matting Agent (E-2) to (E-11)

The acrylic matting agent (E-2) to (E-11) were obtained in the same manner as Preparation Example 11 except that the monomer component and chain transfer agent are changed to the type and amount described in Table 6. The evaluation results of each polymer are shown in Table 6. With regard to Preparation Example 17, Tg of the acrylic matting agent (E-7) was −7° C. so that the polymers are melt-fused to each other. Thus, it was unable to obtain the polymer which is suitable for subsequent evaluation.

TABLE 6

|  |  |  | Preparation Example 11 | Preparation Example 12 | Preparation Example 13 | Preparation Example 14 | Preparation Example 15 | Preparation Example 16 |
|---|---|---|---|---|---|---|---|---|
| Acrylic matting agent |  |  | E-1 | E-2 | E-3 | E-4 | E-5 | E-6 |
| Monomer component [parts] | (b6) | SLMA | 35 | 35 | 35 | 35 | 35 | 41 |
|  | (b7) | MMA | 58 | 58 | 58 | 58 | 58 | 52 |
|  |  | nBMA | — | — | — | — | — | — |
|  |  | CHMA | — | — | — | — | — | — |
|  |  | MA | 7 | 7 | 7 | 7 | 7 | 7 |
|  |  | nBA | — | — | — | — | — | — |
|  |  | HEMA | — | — | — | — | — | — |
|  | (b8) | AMA | — | 0.15 | 0.27 | 0.31 | 0.35 | 0.40 |
|  | Chain transfer agent | nOM | — | 0.015 | 0.06 | 0.08 | 0.08 | 0.08 |
|  |  | nDM | — | — | — | — | — | — |
|  | Polymerization initiator | LPO | 0.40 | 0.40 | 0.40 | 0.40 | 0.40 | 0.40 |
| Glass transition temperature Tg [° C.] |  |  | 18 | 18 | 18 | 18 | 18 | 7 |
| Acetone insolubles [%] |  |  | 0 | 64 | 61 | 43 | 57 | 61 |

TABLE 6-continued

| | | Preparation Example 17 | Preparation Example 18 | Preparation Example 19 | Preparation Example 20 | Preparation Example 21 |
|---|---|---|---|---|---|---|
| Molecular weight of acetone solubles | Mn | 344,000 | 168,000 | 102,000 | 98,000 | 70,000 | 77,000 |
| | Mw | 1,056,000 | 428,000 | 285,000 | 295,000 | 205,000 | 218,000 |
| | Mw/Mn | 3.1 | 2.5 | 2.8 | 3.0 | 2.9 | 2.8 |

| | | | Preparation Example 17 | Preparation Example 18 | Preparation Example 19 | Preparation Example 20 | Preparation Example 21 |
|---|---|---|---|---|---|---|---|
| Acrylic matting agent | | | E-7 | E-8 | E-9 | E-10 | E-11 |
| Monomer component [parts] | (b6) | SLMA | 50 | 20 | — | — | — |
| | (b7) | MMA | 43 | 73 | 30 | — | 60 |
| | | nBMA | — | — | 45 | — | — |
| | | CHMA | — | — | — | 95 | — |
| | | MA | 7 | 7 | — | — | 10 |
| | | nBA | — | — | 25 | 5 | — |
| | | HEMA | — | — | — | — | 30 |
| | (b8) | AMA | 0.45 | 0.27 | 0.27 | — | — |
| | Chain transfer agent | nOM | 0.08 | 0.08 | 0.08 | 0.08 | — |
| | | nDM | — | — | — | — | 0.25 |
| | Polymerization initiator | LPO | 0.40 | 0.40 | 0.40 | 0.40 | 0.52 |
| Glass transition temperature Tg [° C.] | | | −7 | 46 | 15 | 72 | 77 |
| Acetone insolubles [%] | | | — | 30 | 36 | 0 | 0 |
| Molecular weight of acetone solubles | Mn | | — | 101,000 | 98,000 | 106,000 | 80,000 |
| | Mw | | — | 318,000 | 310,000 | 221,000 | 165,000 |
| | Mw/Mn | | — | 3.1 | 3.2 | 2.1 | 2.1 |

Example 21

1. Preparation of the Thermoplastic Resin Composition (γ)

100 Parts of polyvinylidene fluoride as the fluorine-based resin (A) (manufactured by KUREHA CORPORATION, trade name: KF T850), 5 parts of the acrylic matting agent (E-1), and 0.1 part of a hindered phenol-based anti-oxidant "IRGANOX 1076" (trade name) manufactured by BASF SE were blended with one another. The blended mixture was mixed for 30 seconds by using a Henschel mixer. The obtained mixture was supplied to the inside of a twin screw extruder (manufactured by TOSHIBA MACHINE CO., LTD., trade name: TEM35) and extruded as a melt strand from the nozzle at conditions including cylinder temperature of 180 to 200° C. and die head temperature of 220° C. while foreign materials are removed using a #300 screen mesh. Then, pellets of the thermoplastic resin composition (γ) were obtained by cutting.

2. Preparation of the Acrylic Resin (H)

Pellets of the acrylic resin (H) were obtained in the same manner as Preparation Example 1.

3. Production and Evaluation of Layered Film

The pellets of the thermoplastic resin composition (γ) and the pellets of the acrylic resin (H) were dried at 80° C. all day and night. After the drying, the pellets of the acrylic resin (H) were plasticized by adding them to a 40 mmϕ non-bent screw type extruder 1 provided with a #500 screen mesh of which the cylinder temperature was set at 240° C. Furthermore, pellets of the thermoplastic resin composition (γ) were also plasticized by adding them to a 30 mmϕ extruder 2 provided with a #500 screen mesh of which the cylinder temperature was set at 180 to 220° C. Subsequently, a two-layer layered film was discharged through a multi-manifold die for 2 kinds and 2 layers set at a temperature of 240° C., which has been installed at the tip part of both extruders. Subsequently, the film was conveyed such that the acrylic resin layer side of the above two-layer film is in contact in order with the first mirror surface cooling roller at temperature of 80° C. and the second mirror surface cooling roller at temperature of 75° C. Accordingly, a fluorine-based matte layered film with two-layer structure was obtained. The layered film was evaluated in the same manner as Example 1 and the evaluation results are summarized in Table 7.

Examples 22 to 25

A layered film was obtained in the same manner as Example 21 except that the acrylic matting agent (E) is modified to have the type and amount described in Table 7. The evaluation results are summarized in Table 7.

Examples 26 to 28

A layered film was obtained in the same manner as Example 21 except that the acrylic matting agent (E) is modified to have the type and amount described in Table 7 and modification to polyvinylidene fluoride (manufactured by Arkema, trade name: KYNAR720) as the fluorine-based resin (A) is made. The evaluation results are summarized in Table 7.

Comparative Examples 21 to 23

A layered film was obtained in the same manner as Example 21 except that the acrylic matting agent (E) and the fluorine-based resin (A) are modified to have the type and amount described in Table 7. The evaluation results are summarized in Table 7.

In Comparative Example 21, because the acrylic monomer (b6) was contained only in an amount of 20% by mass in the monomer component as a raw material of the acrylic matting agent (E-8), the layered film shows a high value of 60 degree surface gloss, i.e., 97, and thus desired matte appearance cannot be obtained.

In Comparative Example 22, because a monofunctional monomer of which linear alkyl group has carbon atom number of 4 is used as a raw material of the acrylic matting agent (E-8) instead of the acrylic monomer (b6), the layered film shows a high value of 60 degree surface gloss, i.e., 79, and thus desired matte appearance cannot be obtained.

Furthermore, in Comparative Example 23, because a monofunctional monomer of which cyclic alkyl group has carbon atom number of 6 is used as a raw material of the acrylic matting agent (E-10) instead of the acrylic monomer (b6), the layered film shows a high value of 60 degree surface gloss, i.e., 98, and thus desired matte appearance cannot be obtained.

Comparative Example 24

A thermoplastic resin composition and a layered film were prepared in the same manner as Example 26 except that the acrylic matting agent (E-11) (i.e., raw material which is the same as the matting agent (B) of [Preparation Example 1]) is added at the conditions described in Table 7. Because the thermoplastic resin composition containing the acrylic matting agent (E-11) uses a monofunctional monomer having a hydroxyl group among the monomer components as a polymer raw material, adherence of a large amount of gum was shown near the discharge hole of a multi-manifold die. The evaluation results are summarized in Table 7.

Comparative Example 25

A thermoplastic resin composition and a layered film were prepared in the same manner as Example 26 except that, instead of the acrylic matting agent (E), an organic matting agent (manufactured by Nippon Shokubai Co., Ltd., trade name: EPOSTAR MA1004, average particle diameter of 4 to 5 μm) is used in the amount described in Table 7. Because a matting agent is used instead of the acrylic matting agent (E) in the aforementioned thermoplastic resin composition, adherence of a large amount of gum was shown near the discharge hole of a multi-manifold die (i.e., at mate resin layer side). The evaluation results are summarized in Table 7.

TABLE 7

| | | | | Example 21 | Example 22 | Example 23 | Example 24 | Example 25 | Example 26 | Example 27 | Example 28 | Comparative Example 21 | Comparative Example 22 | Comparative Example 23 | Comparative Example 24 | Comparative Example 25 |
|---|---|---|---|---|---|---|---|---|---|---|---|---|---|---|---|---|
| Thermoplastic resin composition (γ) [parts] | Fluorine-based resin (A) | Vinylidene fluoride | T850 | 100 | 100 | 100 | 100 | 100 | — | — | — | — | — | 100 | — | — |
| | | | Kynar720 | — | — | — | — | — | 100 | 100 | 100 | 100 | 100 | — | 100 | 100 |
| | Acrylic matting agent (E) | | E-1 | 5 | — | — | — | — | — | — | — | — | — | — | — | — |
| | | | E-2 | — | 5 | — | — | — | — | — | — | — | — | — | — | — |
| | | | E-3 | — | — | 5 | — | — | — | — | — | — | — | — | — | — |
| | | | E-4 | — | — | — | 5 | 15 | — | — | — | — | — | — | — | — |
| | | | E-5 | — | — | — | — | — | 5 | 15 | — | — | — | — | — | — |
| | | | E-6 | — | — | — | — | — | — | — | 5 | — | — | — | — | — |
| | | | E-8 | — | — | — | — | — | — | — | — | 5 | — | — | — | — |
| | | | E-9 | — | — | — | — | — | — | — | — | — | 5 | — | — | — |
| | | | E-10 | — | — | — | — | — | — | — | — | — | — | 5 | — | — |
| | | | E-11 | — | — | — | — | — | — | — | — | — | — | — | 6 | — |
| | Matting agent | EPOSTAR MA1004 | | — | — | — | — | — | — | — | — | — | — | — | — | 5 |
| | Anti-oxidant | IRGANOX 1076 | | 0.1 | 0.1 | 0.1 | 0.1 | 0.1 | 0.1 | 0.1 | 0.1 | 0.1 | 0.1 | 0.1 | 0.1 | 0.1 |
| Thickness of the matte resin layer [μm] | | | | 7 | 7 | 7 | 7 | 7 | 7 | 7 | 7 | 7 | 7 | 7 | 7 | 7 |
| Thickness of the acrylic resin layer [μm] | | | | 140 | 140 | 140 | 140 | 140 | 140 | 140 | 140 | 140 | 140 | 140 | 140 | 140 |
| Gum evaluation | | | | ○ | ○ | ○ | ○ | ○ | ○ | ○ | ○ | ○ | ○ | ○ | Δ | x |
| Optical characteristics | Total light transmittance [%] | | | 92.4 | 91.5 | 90.9 | 91.0 | 91.6 | 91.7 | 93.0 | 91.5 | 93.1 | 92.2 | 93.0 | — | — |
| | Haze [%] | | | 29.3 | 29.1 | 27.5 | 24.6 | 53.9 | 21.2 | 61.8 | 29.0 | 8.6 | 12.7 | 15.6 | — | — |
| | 60 Degree surface gloss | | | 43 | 37 | 35 | 35 | 15 | 44 | 12 | 43 | 97 | 79 | 98 | — | — |
| Chemical resistance | Chemical resistance 1 | Suntan | | ○ | ○ | ○ | ○ | ○ | ○ | ○ | ○ | ○ | ○ | ○ | — | — |
| | Chemical resistance 2 | Lactic acid | | ○ | ○ | ○ | ○ | ○ | ○ | ○ | ○ | ○ | ○ | ○ | — | — |
| | Chemical resistance 3 | POPPY | | ○ | ○ | ○ | ○ | ○ | ○ | ○ | ○ | ○ | ○ | ○ | — | — |
| | Chemical resistance 4 | Neutrogena | | ○ | ○ | ○ | ○ | ○ | ○ | ○ | ○ | ○ | ○ | ○ | — | — |
| | Chemical resistance 5 | DEET | | ○ | ○ | ○ | ○ | ○ | ○ | ○ | ○ | ○ | Δ | ○ | — | — |

[Preparation Example 31] Preparation of the Crosslinked Acrylic Matting Agent (F-1)

240 Parts of deionized water and 15 parts of 10% aqueous solution "PVA105" by KURARAY POVAL as a dispersion stabilizer were added to a 5 liter reaction vessel equipped with a thermometer, a stirrer, a condenser, and an inlet for introducing nitrogen gas. Under stirring at rate of 200 rpm, the atmosphere inside the reaction vessel was replaced with nitrogen. Meanwhile, the monomer component (b9), an emulsifier, and deionized water having the type and amount described in Table 8 were subjected to an emulsifying treatment for 2 minutes at 11,000 rpm by using a homogenizer (manufactured by IKA, ULTRA-TURRAX T-25) to obtain an emulsion dispersion.

The above emulsion dispersion was added to the above reaction vessel, and under stirring at 200 rpm, the temperature was increased until the inside temperature reaches 70° C. The reaction was continued until a peak resulting from exothermic polymerization is confirmed. After confirming the exothermic peak, the inside temperature was raised to 80° C. and, according to further heating for 1 hour, the polymerization was completed. When the reaction is completed, the aggregate of the polymer latex was filtered using #300 mesh, and the particle diameter of the obtained polymer was measured. The particle diameter was found to be 4.4 μm.

TABLE 8

| | Raw material | Preparation Example 31 F-1 | Preparation Example 32 F-2 |
|---|---|---|---|
| Inside the reaction vessel [parts] | Deionized water | 240 | 240 |
| | PVA105 (10% Aqueous solution) | 15 | 15 |
| Emulsified dispersion solution [parts] | Monomer component (b9) | iBMA | 96.5 | 87.42 |
| | | nBA | 2.0 | 1.75 |
| | | EDMA | 1.5 | 10.83 |
| | | Perocta O | 2.7 | 2.0 |
| | Emulsifier | RS610NA (10% Aqueous solution) | 4.0 | 4.0 |
| | Deionized water | 96.4 | 96.4 |
| Particle diameter (converted to volume average value) [μm] | | 4.4 | 4.5 |

[Preparation Example 32] Preparation of the Crosslinked Acrylic Matting Agent (F-2)

The emulsifying treatment, polymerization, and filtration of aggregate were performed in the same manner as Preparation Example 31 except that the use amount of the monomer component is changed to the conditions shown in Table 8. The particle diameter of the polymer was found to be 4.5 μm.

Example 31

1. Preparation of the Thermoplastic Resin Composition (δ)

100 Parts of polyvinylidene fluoride (manufactured by Arkema, trade name: KYNAR720) as the fluorine-based resin (A), 5 parts of the crosslinked acrylic matting agent (F-1), and 0.1 part of "ADEKASTAB AO-60" (trade name) as an anti-oxidant, which is a phenol-based anti-oxidant manufactured by ADEKA CORPORATION were blended with one another. The blended mixture was mixed for 30 seconds by using a Henschel mixer. The obtained mixture was supplied to the inside of a twin screw extruder (manufactured by TOSHIBA MACHINE CO., LTD., trade name: TEM35) and extruded as a melt strand from the nozzle at conditions including cylinder temperature of 130 to 220° C. and die head temperature of 220° C. while foreign materials are removed using a #300 screen mesh. Then, pellets of the thermoplastic resin composition (δ) were obtained by cutting.

2. Preparation of the Acrylic Resin (H)

Pellets of the acrylic resin (H) were obtained in the same manner as Example 1.

3. Production and Evaluation of Layered Film

A fluorine-based matte layered film with two-layer structure was obtained in the same manner as Example 21 except that pellets of the thermoplastic resin composition (δ) are used instead of pellets of the thermoplastic resin composition (γ). Thickness of the matte resin layer was 7 μm and thickness of the acrylic resin (H) layer was 140 μm. The layered film was evaluated in the same manner as Example 1 and the evaluation results are summarized in Table 9.

Comparative Example 31

A fluorine-based matte layered film was prepared in the same manner as Example 31 except that the crosslinked acrylic matting agent (F-2) is used instead of the crosslinked acrylic matting agent (F-1). The fluorine-based matte layered film has 60 degree surface gloss of 40, and showed favorable chemical resistance. However, it was confirmed that, because the amount of polyfunctional monomer is high at the time of synthesizing the crosslinked acrylic matting agent (F-2), adherence of a large amount of gum was shown near the discharge hole of a multi-manifold die (i.e., fluororesin layer side) at the time of molding a fluorine-based matte layered film.

Comparative Example 32

A fluorine-based matte layered film was prepared in the same manner as Example 31 except that the commercially available crosslinked acrylic resin (manufactured by Nippon Shokubai Co., Ltd., trade name: EPOSTAR MA1004, average particle diameter 4.3 μm) is used instead of the crosslinked acrylic matting agent (F-1). The fluorine-based matte layered film has 60 degree surface gloss of 35, and showed favorable chemical resistance. However, because it is believed that the amount of polyfunctional monomer is high at the time of synthesizing the crosslinked acrylic resin, adherence of a large amount of gum was shown near the discharge hole of a multi-manifold die (i.e., fluororesin layer side) at the time of molding a fluorine-based matte layered film.

TABLE 9

| | | | Example 31 | Comparative Example 31 | Comparative Example 32 |
|---|---|---|---|---|---|
| Thermoplastic resin composition | Fluorine-based resin (A) | Vinylidene fluoride Kynar720 | 100 | 100 | 100 |

TABLE 9-continued

|  |  |  | Example 31 | Comparative Example 31 | Comparative Example 32 |
|---|---|---|---|---|---|
| (δ) | Crosslinked acrylic matting agent (F) | F-1 | 5 | — | — |
|  |  | F-2 | — | 5 | — |
|  |  | EPOSTAR MA1004 | — | — | 5 |
|  | Antioxidant | ADEKASTAB AO-60 | 0.1 | 0.1 | 0.1 |
|  | Thickness of the matte resin layer [μm] |  | 7 | 7 | 7 |
|  | Thickness of the acrylic resin layer [μm] |  | 140 | 140 | 140 |
|  | Gum evaluation |  | ○ | x | x |
| Optical characteristics | Total light transmittance [%] |  | 92.4 | 93.0 | 93.4 |
|  | Haze [%] |  | 34.2 | 38.2 | 37.8 |
|  | 60 Degree surface gloss |  | 53 | 40 | 35 |
| Chemical resistance | Suntan |  | ○ | ○ | ○ |
|  | Lactic acid |  | ○ | ○ | ○ |
|  | POPPY |  | ○ | ○ | ○ |
|  | Neutrogena |  | ○ | ○ | ○ |
|  | DEET |  | Δ | Δ | Δ |

INDUSTRIAL APPLICABILITY

The fluorine-based matte film and fluorine-based matte layered film that are produced by the thermoplastic resin composition of the present invention are specifically suitable for the vehicle application and the building material application.

More specifically, it can suitably be used for the automobile interior application such as instrument panels, console boxes, meter covers, door lock bezels, steering wheels, power window electric switch bases, center clusters and dashboards; for the automobile exterior application such as weather strips, bumpers, bumper guards, side mud guards, body panels, spoilers, front grills, strut mounts, wheel caps, center pillars, door mirrors, center ornaments, side molds, door molds and window molds, windows, head lamp covers, tail lamp covers and windshield components; for the application such as front panels, buttons, emblems and surface decorating materials of AV equipment and furniture products; for the application such as housings, display windows and buttons of mobile phones or the like; for the building interior application such as exterior material application for furniture, wall surfaces, ceilings and floors; for the building exterior application for such as external walls including sidings, fences, roofs, gates and bargeboards; for the furniture surface decorating material application such as window frames, doors, handrails, thresholds and lintels; for the optical component application such as various displays, lenses, mirrors, goggles and windowpanes; or for the interior or exterior application of the various vehicles except for automobiles such as trains, aircrafts and ships, and for various packages and materials of bottles, cosmetic product vessels, accessory cases and the like; and other various applications such as miscellaneous goods including free gifts and small articles.

The invention claimed is:

1. A thermoplastic resin composition (α), comprising:
a fluorine-based resin (A);
a matting agent (B) which is a thermoplastic resin insoluble in the fluorine-based resin (A); and
a thermoplastic resin (C-1) soluble in the fluorine-based resin (A),
wherein the thermoplastic resin (C-1) comprises monomer units derived from:
50 to 100% by mass of alkyl methacrylate;
optionally, 0 to 50% by mass of alkyl acrylate; and
optionally, 0 to 49% by mass of at least one monomer selected from the group consisting of a (meth)acrylic monomer, an aromatic vinyl monomer and a vinyl cyanide monomer,
wherein the matting agent (B) is contained in the thermoplastic resin composition (α) at 1 to 50 parts by mass and the thermoplastic resin (C-1) is contained in the thermoplastic resin composition (α) at 30 to 70 parts by mass, relative to 100 parts by mass of the fluorine-based resin (A).

2. The thermoplastic resin composition (α) according to claim 1, wherein the matting agent (B) is a non-crosslinked acrylic resin comprising a hydroxy group.

3. The thermoplastic resin composition (α) according to claim 1, wherein the thermoplastic resin (C-1) does not contain a hydroxy group.

4. The thermoplastic resin composition (α) according to claim 1, wherein the composition satisfies the following relationship:

$$5.2<SP(B)-SP(AC)<6.6$$

wherein SP (AC) is an SP value of the fluorine-based resin (A) and the thermoplastic resin (C-1) and SP (B) is an SP value of the matting agent (B).

5. The thermoplastic resin composition (α) according to claim 2, wherein a hydroxy number of the non-crosslinked acrylic resin comprising a hydroxy group is 50 to 200 mgKOH/g.

6. The thermoplastic resin composition (α) according to claim 1, wherein the composition satisfies the following relationship:

$$MFR(A)>MFR(C)>MFR(B)$$

wherein MFR (A), MFR (B), and MFR (C) are an MFR of the fluorine-based resin (A), an MFR of the matting agent (B), and an MFR of the thermoplastic resin (C-1), at 250° C. and a load of 49 N, respectively.

7. A thermoplastic resin composition (β), comprising:
a fluorine-based resin (A); and
a acrylic matting agent (D) as a thermoplastic resin,
wherein a content ratio of acrylic acid alkyl ester is 50 to 100% by mass and a content ratio of other monofunctional monomer unit is 0 to 50% by mass, when monofunctional monomer units in the monomer unit constituting the acrylic matting agent (D) is 100% by mass.

8. The thermoplastic resin composition (α) according to claim 1, wherein the fluorine-based resin (A) is a vinylidene fluoride polymer.

9. A fluorine-based matte film obtained by molding the thermoplastic resin composition (α) according to claim 1.

10. A fluorine-based matte layered film obtained by layering the fluorine-based matte film according to claim 9 and the acrylic resin (H).

11. The fluorine-based matte film according to claim 9, wherein 60 degree surface gloss is 5 to 80 on a matte surface.

12. The fluorine-based matte film according to claim 9, wherein 60 degree surface gloss standard deviation is 6 or less.

13. The thermoplastic resin composition (α) according to claim 1, wherein thermoplastic resin (C-1) consists of monomer units derived from:
50 to 100% by mass of alkyl methacrylate;
optionally, 0 to 50% by mass of alkyl acrylate; and optionally, 0 to 49% by mass of at least one monomer selected from the group consisting of a (meth)acrylic monomer, an aromatic vinyl monomer and a vinyl cyanide monomer.

* * * * *